US012597550B2

(12) United States Patent
Doljack et al.

(10) Patent No.: US 12,597,550 B2
(45) Date of Patent: Apr. 7, 2026

(54) OPTIMIZED ELECTROMAGNETIC INDUCTOR COMPONENT DESIGN AND METHODS INCLUDING IMPROVED CONDUCTIVITY COMPOSITE CONDUCTOR MATERIAL

(71) Applicant: Eaton Intelligent Power Limited, Dublin (IE)

(72) Inventors: Frank Anthony Doljack, Pleasanton, CA (US); Ramdev Kanapady, Campbell, CA (US); Hundi Panduranga Kamath, Los Altos, CA (US)

(73) Assignee: Eaton Intelligent Power Limited, Dublin (IE)

( * ) Notice: Subject to any disclaimer, the term of this patent is extended or adjusted under 35 U.S.C. 154(b) by 754 days.

(21) Appl. No.: 18/045,718

(22) Filed: Oct. 11, 2022

(65) Prior Publication Data

US 2023/0197329 A1 Jun. 22, 2023

Related U.S. Application Data

(62) Division of application No. 14/511,266, filed on Oct. 10, 2014, now abandoned.

(51) Int. Cl.

| | |
|---|---|
| ***H01F 7/06*** | (2006.01) |
| ***H01F 27/24*** | (2006.01) |
| ***H01F 27/28*** | (2006.01) |
| ***H01F 41/02*** | (2006.01) |
| ***H01F 41/04*** | (2006.01) |

(52) U.S. Cl.

CPC ......... *H01F 27/24* (2013.01); *H01F 27/2823* (2013.01); *H01F 41/0206* (2013.01); *H01F 41/04* (2013.01)

(58) Field of Classification Search

CPC ...... H01F 17/0033; H01F 17/04; H01F 27/24; H01F 27/2823; H01F 41/0206; H01F 41/04

See application file for complete search history.

(56) References Cited

U.S. PATENT DOCUMENTS

| | | | | |
|---|---|---|---|---|
| 9,613,743 B2 * | 4/2017 | Doljack | .............. | H01F 27/2823 |
| 9,779,866 B2 * | 10/2017 | Doljack | .................. | H01F 7/081 |
| 2012/0020117 A1 * | 1/2012 | Arnold | .................. | H02M 3/155 310/25 |

* cited by examiner

*Primary Examiner* — Paul D Kim
(74) *Attorney, Agent, or Firm* — Baker Botts L.L.P.

(57) ABSTRACT

Electromagnetic inductor components include a magnetic core and a conductor assembled with the core and defining a winding completing a number of turns. The conductor is fabricated from a composite material including carbon nanotubes having an improved conductivity. The conductor has a cross section defined by an effective diameter. The conductor is fabricated to have performance parameters that are selected in view of a function of a ratio of conductivity and/or a function of a ratio of effective diameter of the composite conductor material relative to a reference conductor material as conventionally used in an inductor fabrication.

43 Claims, 26 Drawing Sheets

| Core | 700 Copper wire family of parts (SD core 3.1mm x 3.1mm x 1.0mm) | | | 702 beta=2 and upper limit veffective (same as copper family) and upper limit diameter (same as copper family) | | | 704 beta=2 and lower limit veffective (lower than copper family) and lower limit diameter (lower than copper family) | | | 706 beta=2 and intermediate veffective (lower than copper family) and intermediate diameter (lower than copper family) | | |
|---|---|---|---|---|---|---|---|---|---|---|---|---|
| | L | Isat | DCR | upper L | Isat | upper DCR | upper L | Isat | upper DCR | L | Isat | DCR |
| Sd3110-R50-R | 0.5 | 2.27 | 0.042 | 0.5 | 2.27 | 0.021 | 0.707 | 2.27 | 0.042 | 0.617284 | 2.27 | 0.032007 |
| Sd3110-R82-R | 0.82 | 1.67 | 0.0589 | 0.82 | 1.67 | 0.02945 | 1.15948 | 1.67 | 0.0589 | 1.012346 | 1.67 | 0.044886 |
| Sd3110-1R0-R | 1 | 1.47 | 0.0683 | 1 | 1.47 | 0.03415 | 1.414 | 1.47 | 0.0683 | 1.234568 | 1.47 | 0.05205 |
| Sd3110-1R5-R | 1.5 | 1.19 | 0.103 | 1.5 | 1.19 | 0.515 | 2.121 | 1.19 | 0.103 | 1.851852 | 1.19 | 0.078494 |
| Sd3110-2R2-R | 2.2 | 1 | 0.149 | 2.2 | 1 | 0.745 | 3.1108 | 1 | 0.149 | 2.716049 | 1 | 0.11355 |
| Sd3110-3R3-R | 3.3 | 0.81 | 0.195 | 3.3 | 0.81 | 0.0975 | 4.662 | 0.81 | 0.195 | 4.074074 | 0.81 | 0.148605 |
| Sd3110-4R7-R | 4.7 | 0.68 | 0.285 | 4.7 | 0.68 | 0.1425 | 6.6458 | 0.68 | 0.285 | 5.802469 | 0.68 | 0.217193 |
| Sd3110-6R8-R | 6.8 | 0.58 | 0.346 | 6.8 | 0.58 | 0.173 | 9.6152 | 0.58 | 0.346 | 8.395062 | 0.58 | 0.263679 |
| Sd3110-8R2-R | 8.2 | 0.53 | 0.432 | 8.2 | 0.53 | 0.216 | 11.5948 | 0.53 | 0.432 | 10.12346 | 0.53 | 0.329218 |
| Sd3110-100-R | 10 | 0.47 | 0.505 | 10 | 0.47 | 0.2525 | 14.14 | 0.47 | 0.505 | 12.34568 | 0.47 | 0.38485 |
| Sd3110-150-R | 15 | 0.38 | 0.764 | 15 | 0.38 | 0.382 | 21.21 | 0.38 | 0.764 | 18.51852 | 0.38 | 0.582228 |
| Sd3110-220-R | 22 | 0.32 | 1.13 | 22 | 0.32 | 0.565 | 31.108 | 0.32 | 1.13 | 27.16049 | 0.32 | 0.861149 |
| Sd3110-330-R | 33 | 0.26 | 1.5 | 33 | 0.26 | 0.75 | 46.662 | 0.26 | 1.5 | 40.74074 | 0.26 | 1.143118 |
| Sd3110-470-R | 47 | 0.22 | 2.06 | 47 | 0.22 | 1.03 | 66.458 | 0.22 | 2.06 | 58.02469 | 0.22 | 1.569883 |
| Sd3110-680-R | 68 | 0.182 | 3.13 | 68 | 0.182 | 1.565 | 96.152 | 0.182 | 3.13 | 83.95062 | 0.182 | 2.385307 |
| Sd3110-820-R | 82 | 0.166 | 3.57 | 82 | 0.166 | 1.785 | 115.948 | 0.166 | 3.57 | 101.2346 | 0.166 | 2.720622 |
| Sd3110-101-R | 100 | 0.15 | 4.72 | 100 | 0.15 | 2.36 | 141.4 | 0.15 | 4.72 | 123.4568 | 0.15 | 3.597013 |
| Sd3110-151-R | 150 | 0.123 | 6.16 | 150 | 0.123 | 3.08 | 212.1 | 0.123 | 6.16 | 185.1852 | 0.123 | 4.694406 |
| Sd3110-221-R | 220 | 0.1 | 9.46 | 220 | 0.12 | 4.73 | 311.08 | 0.12 | 9.46 | 271.6049 | 0.12 | 7.209267 |

| 702 | 704 | 706 |
|---|---|---|
| veffective = 1 (air gap not changed) | veffective = .707 (air gap enlarged) | veffective = .81 (air gap enlarged) |
| diameter = 1 | diameter = 0.840896 | diameter = 0.90 |

FIG. 22

OPTIMIZED ELECTROMAGNETIC INDUCTOR COMPONENT DESIGN AND METHODS INCLUDING IMPROVED CONDUCTIVITY COMPOSITE CONDUCTOR MATERIAL

CROSS REFERENCE TO RELATED APPLICATIONS

This application is a divisional application of the U.S. patent application Ser. No. 14/511,266, filed on Dec. 10, 2014, the disclosures of which are hereby incorporated by reference in their entirety.

BACKGROUND OF THE INVENTION

The field of the invention relates generally to the design manufacture of electromagnetic components and related methods, and more particularly to the design and manufacture of electromagnetic components such as inductors for electronic devices and applications.

Electromagnetic components such as inductors are known that utilize electric current and magnetic fields to provide a desired effect in an electrical circuit. Current flow through a conductor in the inductor component generates a magnetic field. The magnetic field can, in turn, be productively used to store energy in a magnetic core, release energy from the magnetic core, or to cancel undesirable signal components and noise in power lines and signal lines of electrical and electronic devices.

Recent trends to produce increasingly powerful, yet smaller electronic devices have led to numerous challenges to the electronics industry. Electronic devices such as smart phones, personal digital assistant (PDA) devices, entertainment devices, and portable computer devices, to name a few, are now widely owned and operated by a large, and growing, population of users. Such devices include an impressive, and rapidly expanding, array of features allowing such devices to interconnect with a plurality of communication networks, including but not limited to the Internet, as well as other electronic devices. Rapid information exchange using wireless communication platforms is possible using such devices, and such devices have become very convenient and popular to business and personal users alike.

For surface mount component manufacturers for circuit board applications required by such electronic devices, the challenge has been to provide increasingly miniaturized inductor components so as to minimize the area occupied on a circuit board by the inductor component (sometimes referred to as the component "footprint") and also its height measured in a direction perpendicular to a plane of the circuit board (sometimes referred to as the component "profile"). By decreasing the footprint and profile of inductor components, the size of the circuit board assemblies for electronic devices can be reduced and/or the component density on the circuit board(s) can be increased, which allows for reductions in size of the electronic device itself or increased capabilities of a device with comparable size. Miniaturizing electronic components in a cost effective manner has introduced a number of practical challenges to electronic component manufacturers in a highly competitive marketplace. Because of the high volume of inductor components needed for electronic devices in great demand, cost reduction in fabricating inductor components has been of great practical interest to electronic component manufacturers.

In order to meet increasing demand for electronic devices, especially hand held devices, each generation of electronic devices need to be not only smaller, but offer increased functional features and capabilities. As a result, the electronic devices must be increasingly powerful devices. For some types of components, such as electromagnetic inductor components that, among other things, may provide energy storage and regulation capabilities, meeting increased power demands while continuing to reduce the size of inductor components that are already quite small, has proven challenging.

BRIEF DESCRIPTION OF THE DRAWINGS

Non-limiting and non-exhaustive embodiments are described with reference to the following figures, wherein like reference numerals refer to like parts throughout the various drawings unless otherwise specified.

FIG. 22 is a comparison table highlighting design improvements with respect to DC Resistance and Inductance for a series of inductor components formed in accordance with exemplary embodiments of the invention including an improved conductivity composite conductor material and wherein a saturation current value is fixed with respect to a conventional set of inductor components.

DETAILED DESCRIPTION OF THE INVENTION

Figure 1:
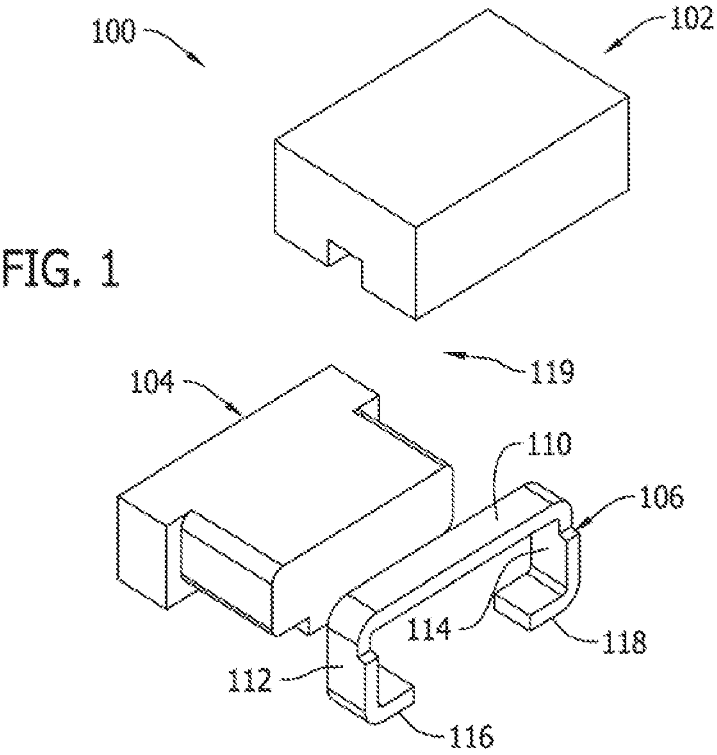
FIG. 1 is an exploded view of a first exemplary embodiment of an electromagnetic inductor component formed in accordance with an exemplary embodiment of the invention and including an improved conductivity composite conductor material.

Exemplary embodiments of inventive electromagnetic component assemblies and constructions, and related methodologies and methods of inductor component design and manufacture, are described below that, among other things, facilitate the design and manufacture of optimal electromagnetic inductor components in applications such as power circuitry for higher current and power applications having low profiles that are difficult, if not impossible, to achieve, using conventional electromagnetic component design and fabrication techniques. Electromagnetic inductor components, and more specifically power inductor components, may also be fabricated with reduced cost compared to other known miniaturized inductor component constructions. Manufacturing methodology and steps associated with the devices described are in part apparent and in part specifically described below but are believed to be well within the purview of those in the art without further explanation. While described in the context of power inductors, other types of inductors may likewise benefit from the concepts disclosed herein below, including but not limited to non-power inductors such as noise cancelling inductors.

As used herein the term "power inductor" shall refer to an electromagnetic component provided in power supply management applications and power management circuitry on circuit boards for powering a host of electronic devices, including but not necessarily limited to hand held electronic devices. Power inductors are designed to induce magnetic fields in magnetic cores via current flowing through one or more conductive windings, and store energy via the generation of magnetic fields in magnetic cores associated with the windings. Power inductors also return the stored energy to the associated electrical circuit as the current through the winding and may, for example, provide regulated power from rapidly switching power supplies.

As used herein, the term "non-power inductor," amongst other things, shall refer to an electromagnetic component provided for filtering purposes in an electrical circuit, and is distinguishable from a power inductor. Such non-power inductors are sometimes referred to as noise suppression components and typically operate on signal lines, as opposed to power lines, in the circuitry. For example, one type of non-power inductor is designed to induce magnetic fields in a magnetic core via current flowing through more than one conductive winding in opposite directions to one another, with the magnetic fields cancelling one another to remove undesirable noise. Unlike a power inductor, a non-power inductor is typically not designed to store energy via the generation of magnetic fields. In a non-power inductor, energy storage would effectively amount to an undesirable, parasitic power loss in the circuitry.

For clarity, the term "transformer" shall refer to an electromagnetic component provided for achieving an increase or decrease in current or voltage in an electrical circuit, and is distinguishable from the inductors described above (i.e., power and non-power inductors). Transformers are designed to induce a magnetic field in a magnetic core as current flows through a primary winding, and from that magnetic field to induce a current in a secondary winding that is configured to have a ratio of the turns of the primary winding. The current output from the secondary winding may be increased or decreased by the ratio provided in the primary and secondary winding. Also unlike a power inductor, a transformer is typically not designed to store energy via the generation of magnetic fields. In a transformer, energy storage would effectively amount to an undesirable, parasitic power loss in the circuitry. Each type of electromagnetic component described above therefore utilizes principles of magnetism and inductance via current flow through electrical conductors, but in different ways to achieve a desired result. The different ways that the principles of inductance and desired results are obtained are reflected by structural differences in the devices that allow such disparate results to occur. As such, one type of electromagnetic inductor component (e.g. a power inductor) is generally incapable of serving as another type (e.g., a non-power inductor). Likewise, neither power inductor components nor non-power inductor components are generally capable of serving as a transformer, nor are transformer components generally capable of serving as power or non-power inductor components. Instead of being interchangeable components, each type of electromagnetic component described above is typically custom designed for a particular application and environment, and even in the same application or environment, power inductors, non-power inductors, and transformers may be provided as discrete components that are used in combination with each component providing its own unique function in the circuitry.

The engineering principles of electromagnetic inductor component design are well known but difficult to apply in some aspects, and as a result the manufacture of electromagnetic inductor components is partly experimental in nature. That is, electromagnetic inductor component manufacturers tend to adopt designs through an iterative process wherein a design may be developed in a theoretical manner, prototypes of the design may be made and tested to evaluate the theoretical design, changes are proposed in view of the test results, and another round of components is made and tested. Such a process may be, and has been, successfully accomplished to provide satisfactory electromagnetic inductor components meeting desired specifications in certain aspects. To some extent, because of the number of inductor designs that are known for certain applications, the theoretical design step may be omitted and one may instead change an existing design and proceed with testing of prototypes to assess the impact of the change.

Because of the experimental nature of the electromagnetic inductor component design, a design may be achieved that meets a specification but is nonetheless sub-optimal. Because the impact of a design change in one aspect of the inductor component manufacture to other aspects of the resultant component are not well understood or easy to predict, there is typically some trial and error in arriving at a final design that meets a specification in a desired attribute, but once the specification is met it may have negatively (and unknowingly) affected another performance attribute. This is perhaps even more so in the manufacture of miniaturized inductor components that may be surface mounted to circuit boards in smaller packages and design envelopes to facilitate the manufacture of increasingly smaller and/or increasingly powerful portable electronic devices.

Any inductor component will include an electrically conductive coil and a magnetic core. The basic, theoretical design of the inductor component may proceed with the application of Ampere's law (relating to the current flow through the coil(s) in the component when connected to an energized electrical circuit), Faraday's law (relating to the generation of magnetic fields created by current flow through the coil(s)) and the particular characteristics of the magnetic core material in which the magnetic fields occur. The coils define a number of turns of a winding to achieve a desired effect, such as, for example, a desired inductance value for a selected end use application of the inductor component. Inductance ratings of the inductor component may be varied considerably for different applications by varying the number of turns in the winding, the arrangement of the turns of the winding in the magnetic core, the cross sectional area of the turns in the winding, and the properties of the magnetic core materials themselves. Physical gaps may be established for the storage of energy in the magnetic core, and/or so-called distributed gap materials may be utilized to construct the core. The core may be constructed in one piece or multiple pieces.

A great focus is reflected in the patent literature regarding the development of magnetic core materials that can enhance the performance of electromagnetic inductor components in various applications, and a great variety of different shapes of the magnetic cores is also reflected in the patent literature to achieve desired inductor characteristics. In some cases, separate core pieces are combined to define a magnetic core structure. In other cases, single piece, monolithic cores structures may be provided to embed, encase or surround portions of the inductor windings. The core pieces may be fabricated from granular, magnetic powder materials in a pressing operation (sometimes referred to as a "dust core" construction). Magnetic core structures may alternatively be laminated using layers of pre-formed materials that are joined or united as layers, or successively formed one upon another in the fabrication of an inductor component. Magnetic core structures may be formed to include a combination of discrete inductor components that are each individually operable, or may be formed to include windings that are mutually coupled to one another in a flux sharing relationship. Single phase and multi-phase inductor components may be provided for different electrical power distribution systems.

Regarding the fabrication of the coils for an inductor component, copper is and has been predominately the conductive material of choice by electromagnetic component manufacturers. A great deal of different configurations of windings now exist that can be combined with the various different magnetic materials discussed above. Coils and windings fabricated from copper have been effectively utilized to provide adequate performance in combination with a variety of magnetic materials to fabricate the magnetic core including the windings in increasingly smaller packages. Great efforts have been made in recent times, with some success, to manufacture smaller electromagnetic inductor components and/or to increase the power capabilities of inductor components that are already quite small.

However, the use of copper to fabricate the inductor windings or coils is believed to impose a ceiling to the development of higher performing inductors and/or to provide comparable performance to existing inductors in smaller package sizes. In other words, the performance potential of copper windings and known magnetic materials is believed to have reached its peak, such that copper-based winding and coils have little more to offer in terms of providing performance improvement and reduction in size of inductor components. Because the demand for further size reduction and miniaturization of inductor components having improved performance has not subsided, a new approach is needed to further improve electromagnetic inductor performance, reduce the size of electromagnetic inductor components, and also to reduce the cost of electromagnetic inductor components.

In order to achieve increased performance while continuing to reduce the size of electromagnetic inductor components that are already quite small, the present invention proposes the use of a composite conductive material for fabricating the coils of the electromagnetic inductor component. In contemplated examples, the composite conductive material has a conductivity that is greater than copper to facilitate still further improvement in performance of inductors. In contemplated embodiments, the composite conductive material may include known conductive metals, or conductive metal alloys, in combination with carbon nanotubes (hereinafter CNTs). Metals such as copper, silver or other metals and alloys, for example, may be enhanced with CNTs to provide superior electrical properties to those of the metal or metal alloys alone (i.e., the metal or metal alloys without CNTs).

For example, in various exemplary embodiments the composite conductive material may include 1-99% CNTs by weight to provide varying degrees of improved conductivity. In various contemplated embodiments, the composite conductive material including CNTs may be fabricated into flexible wire conductors that may be wound into a winding for assembly with a magnetic core piece, may be fabricated into layers of material from which conductors may be stamped and shaped into a desired geometric configuration, or may be deposited on substrate materials using known techniques. Single walled CNTs or multiple walled CNTs may be utilized and bonded to or otherwise joined with a metal or metal alloy to provide a composite material having improved conductivity relative to copper and other known metals that have been used to fabricate windings in conventional inductor fabrication. Consortiums of companies and universities have been established to develop such composite conductive materials and their manufacture.

In contemplated embodiments, a ratio of conductivity ($\beta$) of the composite conductive material including CNTs relative to that of copper may be within a range of, for example, about 1.1 to about 10.0. Such composite conductive materials are sometimes referred to as ultra-conductive materials due to their greatly increased conductivity relative to pure metals. Such ultra-conductivity is possible using such materials at room temperature, and is expressly contrasted with so-called superconductor materials that require cooling below critical temperatures in order to achieve nearly zero electrical resistance.

The use of new composite ultra-conductive materials to fabricate coils and windings in electromagnetic inductor component fabrication presents both great opportunities and great challenges to electromagnetic component manufacturers. The improved conductivity of the composite conductor materials provides much potential for improving electromagnetic performance, but the implications of its use leave much to be explored. As previously mentioned, because so much of the electromagnetic inductor component knowledge base has been built around copper-based windings, the relation between improved conductivity of windings and other important attributes of the electromagnetic inductor component are not immediately clear. Thus, the implementation of ultra-conductive materials may mean much more significant trial and error experimentation in relation to existing inductor designs, with much expense and associated delay in delivering electromagnetic inductor components that meet desired specifications.

In one aspect of the present invention, a methodology is proposed that facilitates adjusting/selecting electrical parameters associated with inductors, such as inductance, effective permeability, saturation current, DC resistance, diameter of the coil conductor, the number of turns, and core volume based on the ratio of conductivity of a selected composite ultra-conductive material to previously used conductive materials such as copper in the fabrication of electromagnetic inductor components. Previously known inductor designs can be effectively adapted for use with ultra-conductive materials with highly reliable results that may avoid the expense and delays of experiments that may otherwise be required to implement ultra-conductive materials in electromagnetic inductor component constructions. Advantageously, the ratio of conductivity can be utilized to fabricate inductors having ultra-conductive material windings with smaller core structures, or alternatively to provide inductors of approximately the same size as existing inductors but with much greater performance capability.

In another aspect, the invention proposes identifying a range (i.e. an upper limit and lower limit), of an effective diameter of a conductor used to fabricate the coil based on the ratio of conductivity of the composite material used to fabricate the coil and an effective diameter of a similarly configured inductor having a conventional metal coil of lower conductivity such as copper. More specifically, the invention proposes to identify upper and lower limits of a ratio of an effective diameter of the improved conductivity conductor relative to a reference conductor (e.g., a copper-based conductor) in a reference inductor. Based on a range defined by the ratio of conductivity of the composite material and coil conductor diameters (or range of ratio of effective diameter of an improved conductivity conductor relative to a reference effective diameter of a reference conductor fabricated from a lower conductivity material such as copper), values of any one of the following exemplary performance parameters may be selected: effective permeability of the magnetic core, saturation current for the component, direct current resistance (DCR), inductance value, number of turns, and core volume. When one of the parameter values is selected, the remaining ones of the parameters such as effective permeability of the core, saturation current, DC resistance, resultant inductance, number of turns, and core volume may be adjusted to provide an inductor with desired performance improvements. The magnetic core volume, which relates to the physical size of the completed inductor component, is determined by a Window Area (WA), Mean Length Per Turn (MLT), and Cross sectional Area (AC) as explained below, and these attributes too may be adjusted to vary the size of the inductor component fabrication including the ultra-conductive composite material.

In accordance with some of the contemplated embodiments, the ratio of electrical conductivity (β) of composite conductive material to that of copper used in a reference conductor of copper is greater than 1. The ratio of electrical conductivity (β) defines an upper limit and lower limit of a diameter ratio (δ) of the coil conductor formed of a composite conductive material relative to a diameter of reference coil conductor formed of copper in the reference inductor.

At a saturation current equal to that of the reference inductor, the inductance, core volume and the DC resistance is adjustable within a range/region defined by the ratio of electrical conductivity (β) and the diameter ratio (δ) to obtain desired values.

The "reference inductor" for the discussion herein is an inductor having a reference inductance value, reference direct current resistance (DCR) value, and a reference saturation current value. The reference inductor also includes a reference core structure having a reference effective permeability value, and a reference core volume including a reference Window Area (WA), a reference Mean Length Per Turn (MLT), and a reference Cross sectional Area (AC). Further, the reference inductor includes a coil formed of copper having a reference coil diameter, and a reference number of turns.

In accordance with embodiments of the present invention, the diameter of the coil conductor fabricated with ultra-conductive composite material in relation to a reference coil conductor made of copper used in the reference inductor is within a range of 1 to ($1/\beta^{1/2}$ (or $\beta^{(-1/2)}$).

In accordance with embodiments of the invention, when the saturation current is equal to that of the reference inductor and when the diameter ratio (δ) of the conductor is within the range 1 and $\beta^{-1/4}$, the inductor's desired value of inductance is within an upper limit defined by ($\delta^{-2}$) and a lower limit equal to 1. Further, a desired value of the direct current resistance (DCR) of the inductor is within an upper limit defined by [$\beta^{(-1)}*\delta^{(-4)}$], and a lower limit defined by [$\beta^{(-1)}*\delta^{(-2)}$]. A desired value of core volume of the inductor may be adjusted between an upper limit equal to 1, and a lower limit defined by ($\delta^2$). A desired value of the effective permeability of the inductor may be adjusted between an upper limit defined by $\delta^{2/3}$, and a lower limit defined by ($\delta^2$). Further, a desired value of the number of turns of coil of the inductor is adjusted between an upper limit defined by $\delta^{(-2)}$, and a lower limit defined by ($\delta^{(-2/3)}$).

In accordance with some embodiments, at a saturation current equal to that of the reference inductor and diameter ratio (δ) within the range 1 and $\beta^{-1/4}$, a desired value of the height of the Window Area (WA) within the core may be adjusted between an upper limit equal to 1, and a lower limit defined by ($\delta^2$). In such case the desired value of the number of turns of coil of the inductor is adjusted between an upper limit defined by ($\delta^{-2}$) and a lower limit equal to 1. A desired value of the effective permeability of the inductor is adjusted between an upper limit equal to 1 and a lower limit defined by ($\delta^2$).

In another aspect, when the saturation current is selected to be equal to that of the reference inductor and when the diameter ratio (δ) of the conductor is within the range $\beta^{-1/4}$ to $\beta^{-1/2}$, the inductor's desired value of inductance is adjusted between an upper limit defined by [$\beta*\delta^2$], and a lower limit equal to 1. Further, the core volume may be adjusted between an upper limit defined by [$\beta*\delta^{(4)}$], and a lower limit defined by ($\delta^2$). The inductor's desired value of DC resistance may be adjusted between an upper limit equal to 1, and a lower limit defined by [$\beta^{(-1)}*\delta^{(-2)}$]. A desired value of the effective permeability of the inductor is adjusted between an upper limit defined by $\delta^{2/3}$, and a lower limit defined by [$\beta^{(-2/3)}*\delta^{(-2/3)}$]. A desired value of the number of turns in the coil winding of the inductor is adjusted between an upper limit defined by [$\beta^{(2/3)}*\delta^{(2/3)}$], and a lower limit defined by ($\delta^{(-2/3)}$).

In accordance with some embodiments, when the saturation current is selected to be equal to that of the reference inductor and the diameter ratio (δ) is within the range $\beta^{-1/4}$ to $\beta^{-1/2}$, the height of the Window Area (WA) within the core may be adjusted between an upper limit defined by [$\beta*\delta^{(4)}$], and a lower limit defined by ($\delta^2$). In such case the desired value of a number of turns of the coil of the inductor may be adjusted between an upper limit defined by [$\beta*\delta^2$] and a lower limit equal to 1. Further a desired value of the effective permeability of the inductor may be adjusted between an upper limit equal to 1 and a lower limit defined by $[\beta^{(-1)}*\delta^{(-2)}]$.

Figure 2:
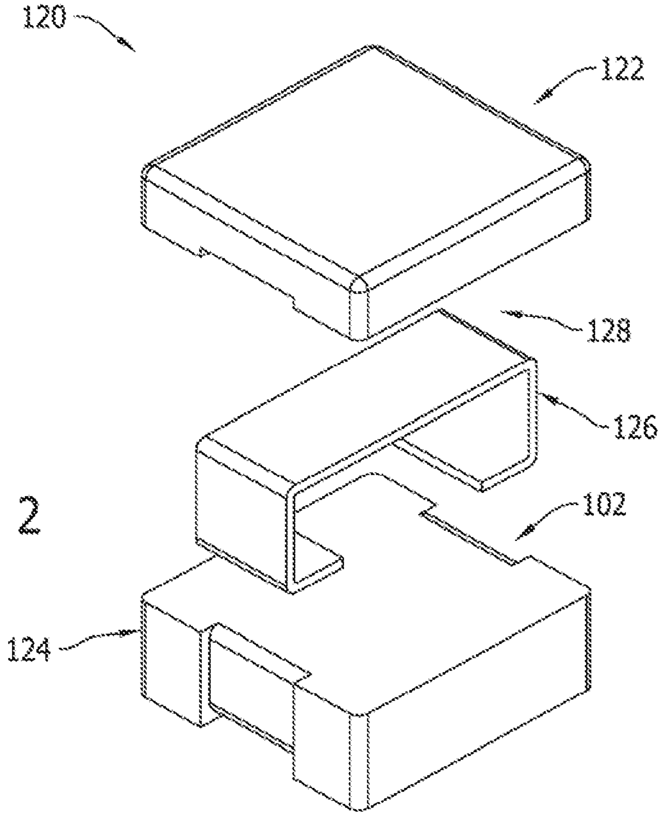
FIG. 2 is an exploded view of a second exemplary embodiment an electromagnetic inductor component formed in accordance with an exemplary embodiment of the invention and including an improved conductivity composite conductor material.

Referring to FIG. 1, an exemplary inductor component 100 is shown that may be fabricated in accordance with an embodiment of the present invention. The inductor 100 includes a first core piece 102, a second core piece 104, and a coil or winding 106. The core pieces 102, 104 are each formed from materials having a desired magnetic permeability. More specifically, the core pieces 102, 104 can be fabricated from iron, iron alloys, or ferrimagnetic ceramic materials, other suitable magnetic materials, and combinations thereof. Each core piece 102, 104 can be independently fabricated into the shapes shown (which in the examples of FIGS. 1 and 2 are different from one another) using granular powder materials. Alternatively, one or both of the core pieces 102, 104 can be fabricated by stacking multiple blocks or sheets of magnetic material that may be pre-formed in some embodiments. In still other embodiments, a monolithic, single piece core construction may be provided to include the coil 106 in lieu of the two discrete core pieces 102, 104 as shown.

For example, magnetically responsive sheet materials may be provided to include soft magnetic particles dispersed in a binder material, and may be provided as freestanding thin layers or films that may be assembled in solid form, as opposed to semi-solid or liquid materials that are deposited on and supported by a substrate material. Soft magnetic powder particles may be used to make the magnetic composite sheets, including Ferrite particles, Iron (Fe) particles, Sendust (Fe—Si—Al) particles, MPP (Ni—Mo—Fe) particles, HighFlux (Ni—Fe) particles, Megaflux (Fe—Si Alloy) particles, iron-based amorphous powder particles, cobalt-based amorphous powder particles, and other suitable materials known in the art. Combinations of such magnetic powder particle materials may also be utilized if desired. The magnetic powder particles may be obtained using known methods and techniques. Optionally, the magnetic powder particles may be coated with an insulating material.

After being formed, the magnetic powder particles may be mixed and combined with a binder material. The binder material may be a polymer based resin having desirable heat flow characteristics in the layered construction of a magnetic core for higher current, higher power use of the component 100. The resin may further be thermoplastic or thermoset in nature, either of which facilitates lamination of the sheet layers provided with heat and pressure. Solvents and the like may optionally be added to facilitate the composite material processing. The composite powder particle and resin material may be formed and solidified into a definite shape and form, such as substantially planar and flexible thin sheets. Further details of pre-formed magnetic sheet layers are described in the commonly owned U.S. patent application Ser. No. 12/766,382, the entire disclosure of which is hereby incorporated by reference. Insulator sheets may be used in combination with magnetic sheets as desired, or the magnetic sheets may be joined in surface contact without any intervening layers between them.

The coil or winding 106 in the example shown in FIG. 1 includes a generally flat and planar main winding section 110, first and second legs 112, 114 extending from either end of the main winding section 110 in an orientation generally perpendicular to the main winding section 110, and first and second terminal sections 116, 118 extending from the legs 112, 114 in a generally parallel orientation to the main winding section 110. The terminal sections 116, 118 define surface mount areas for connection of circuitry on a circuit board (not shown) via, for example, surface mount, soldering techniques. The coil 106 may be fabricated from a planar piece of composite, ultra-conductive material described above, and subsequently bent or otherwise shaped in the configuration shown that is sometimes referred to as a C-shaped configuration due to its resemblance in side profile. While one coil 106 is shown in the example of FIG. 1, more than one coil may be provided. In a multiple coil embodiment, the coils may be arranged in a flux sharing relationship with one another.

In the example shown in FIG. 1, the coil 106 may be pre-formed and provided for assembly with the core pieces 102, 104. The pre-formed coil 106 may first be assembled to the core piece 104 with sliding engagement in a horizontal direction in the drawing of FIG. 1. The core piece 102 may then be assembled over the core piece 104 and assembled coil 106. When assembled, the main winding section 110 of the ultra-conductive coil 106 extends between the facing core pieces 102 and 104. A physical gap, represented by the element 119 in FIG. 1 may be established in a known manner, and may be an air gap or a non-magnetic gap established with a solid material that lacks magnetic properties. Alternatively, the core structure may be fabricated using so-called distributed gap materials, such as with the pre-formed magnetic sheet layers described above, and therefore avoid any need to provide physical gaps (whether via air or non-magnetic materials) in the core structure. The core structure in the example shown generally has a volume that is a function of a Window Area (WA) to be occupied by the coil, Mean Length Per Turn (MLT) for the coil, and Cross-sectional Area (AC) of the core structure where the coil resides.

The inductor component 100 shown in FIG. 1 may be referenced to a reference inductor of a similar configuration, but having a copper-based coil 106, and is but one example of a type of inductor component 100 that may benefit from the design approach described herein. The inductor component 100 is advantageously compact and may be assembled in a relatively simple manufacturing process to produce a miniaturized inductor component for a circuit board application. The pre-formed core pieces 102, 104 and the pre-formed coil 106 avoid certain manufacturing difficulties and undesirable performance fluctuation associated with winding a flexible conductor or otherwise forming a coil around small core pieces 102, 104. The pre-formed coil 106 is further configured with a greater cross sectional area to handle a higher current, higher power application while still providing a small, low profile component. The configuration of the inductor component 100 shown beneficially provides an efficient power inductor at an economical cost.

FIG. 2 shows another exemplary inductor component 120 that may be fabricated in accordance with an embodiment of the present invention. The inductor 120 includes a first core piece 122, a second core piece 124, and a coil or winding 126. The core pieces 122, 124 are each formed from materials having a desired magnetic permeability, such as those described above. The coil 126 may be fabricated from an ultra-conductive composite material such as those described above. The shapes of the core pieces 122, 124 are seen to be different from those shown in FIG. 1, and the coil 126 may be shaped over the surface of the core piece 104 into a C-shaped configuration similar to that described above in relation to the coil 106 (FIG. 1). The core pieces 122, 124 may be gapped, as represented by the element 128 when the core piece 122 is assembled over the core piece 124 and the coil 126 in a similar manner to those discussed above. The core structure in the example shown generally has a volume that is a function of a Window Area (WA) to be occupied by the coil, Mean Length Per Turn (MLT) for the coil, and Cross-sectional Area (AC) of the core structure where the coil resides.

The component 120 shown in FIG. 2 may be referenced to a reference inductor of a similar configuration, but having a copper-based coil 126, and is but one example of a type of inductor component that may benefit from the design approach described herein. The component 120 is advantageously compact and may be assembled in a relatively simple manufacturing process to produce a miniaturized inductor component for a circuit board application. The coil 126 is further configured with a greater cross sectional area to handle a higher current application while still providing a small, low profile component. The configuration of the component 120 shown beneficially provides an efficient power inductor at an economical cost. The core structure in the example shown generally has a volume that is a function of a Window Area (WA) to be occupied by the coil, Mean Length Per Turn (MLT) for the coil, and Cross-sectional Area (AC) of the core structure where the coil resides.

Figure 3A:
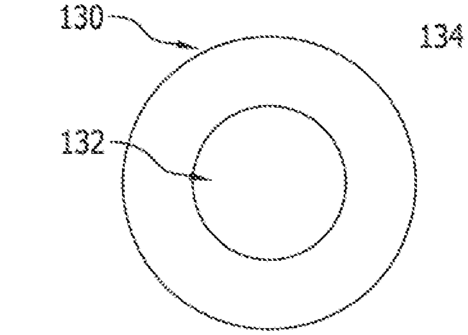
FIGS. 3A, 3B and 3C depict an exemplary magnetic core configuration in plan view in FIG. 3A, cross sectional view in FIG. 3B and in perspective view in FIG. 3C that may be utilized in an electromagnetic inductor component formed in accordance with an exemplary embodiment of the invention and including an improved conductivity composite conductor material.
Figure 3B:
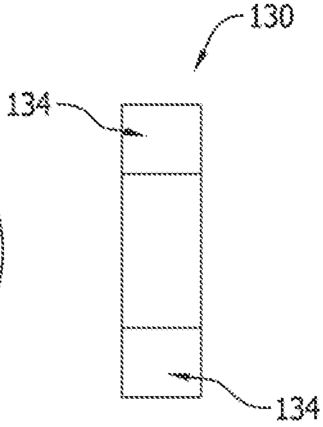
Figure 3C:
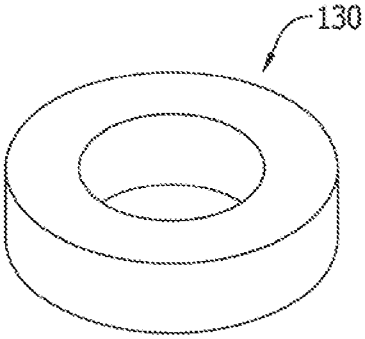

FIGS. 3A, 3B, 3C depict an exemplary toroidal core configuration 130 in plan view (FIG. 3A), cross sectional view (FIG. 3B) and in perspective view (FIG. 3C) that may be utilized in accordance with an exemplary embodiment of an inductor component in accordance with the present invention. The toroidal core 130 may be fabricated from magnetic materials such as those described above. A composite, ultra-conductive conductor such as a wire (not shown in FIGS. 3A, 3B, 3C) may be wound on the surface of the toroidal core 130 to complete a winding in a known manner and provide an inductor component. The toroidal core 130 in the example shown generally has a volume that is a function of Window Area (WA) where the coil is applied, Mean Length Per Turn (MLT) for the coil, and Cross-sectional Area (AC). FIG. 3A shows a Window Area 132 and a Cross-sectional Area 134 is shown in FIG. 3B.

An inductor component including the toroidal core 130 shown in FIGS. 3A, 3B, 3C may be referenced to a reference inductor of a similar configuration, but having a copper-based coil, and is but one example of a type of inductor component that may benefit from the design approach described herein. The leads of the winding may be connected to terminal clips that may, in turn, be surface mounted to a circuit board. Alternatively, the leads of the winding formed on the core 130 may be through-hole mounted to a circuit board. In some embodiments, the winding formed on the core 130 need not connect to a circuit board at all, but rather may be terminated to external circuitry using known connections and techniques.

Figure 4A:
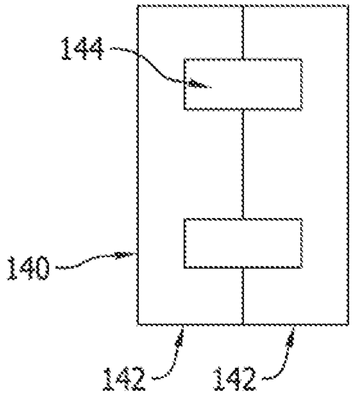
FIGS. 4A, 4B and 4C depict an exemplary magnetic core configuration in plan view in FIG. 4A, cross sectional view in FIG. 4B and in perspective view in FIG. 4C that may be utilized in an electromagnetic inductor component formed in accordance with an exemplary embodiment of the invention and including an improved conductivity composite conductor material.
Figure 4B:
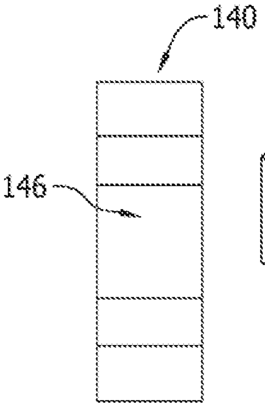
Figure 4C:
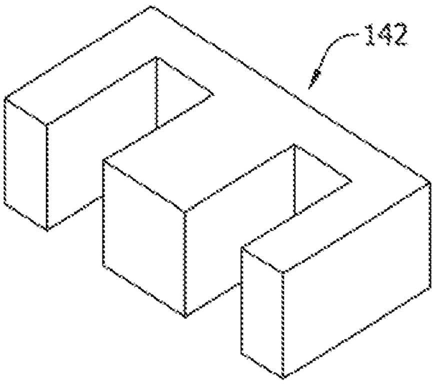

FIG. 4A, 4B, 4C depict an exemplary EE core configuration 140 in plan view (FIG. 4A) and including first and second core pieces 142 that are identically shaped but assembled in a reverse or mirror-image arrangement with respect to one another. The core pieces 142 may be fabricated from magnetic materials such as those described above. The EE core configuration 140 is shown in cross section in FIG. 4B and the core piece 142 is shown in perspective view (FIG. 4C). The EE core configuration 140 may be utilized in accordance with an exemplary embodiment of the invention when a composite, ultra-conductive wire (not shown in FIG. 4) is wound on the surface of the EE core configuration 140 to complete a winding in a known manner and provide an inductor component. Alternatively, a pre-formed coil including a winding may be provided and assembled with the core pieces 142 to complete the inductor component. The EE core configuration 140 in the example shown generally has a volume that is a function of Window Area (WA) where the coil is applied, Mean Length Per Turn (MLT) for the coil, and Cross-sectional Area (AC). FIG. 4A shows a Window Area 144 and a Cross-sectional Area 146 associated with the coil is shown in FIG. 4B.

An inductor component including the EE core configuration 140 shown in FIGS. 4A, 4B, 4C may be referenced to a reference inductor of a similar configuration, but having a copper-based coil, and is but one example of a type of inductor component that may benefit from the design approach described herein. The leads of the winding may be connected to terminal clips that may, in turn, be surface mounted to a circuit board. Alternatively, the leads of the winding formed on the core 140 may be through-hole mounted to a circuit board. In some embodiments, the winding formed on the core 140 need not connect to a circuit board at all, but rather may be terminated to external circuitry using known connections and techniques.

Figures 5A, 5B, 5C:
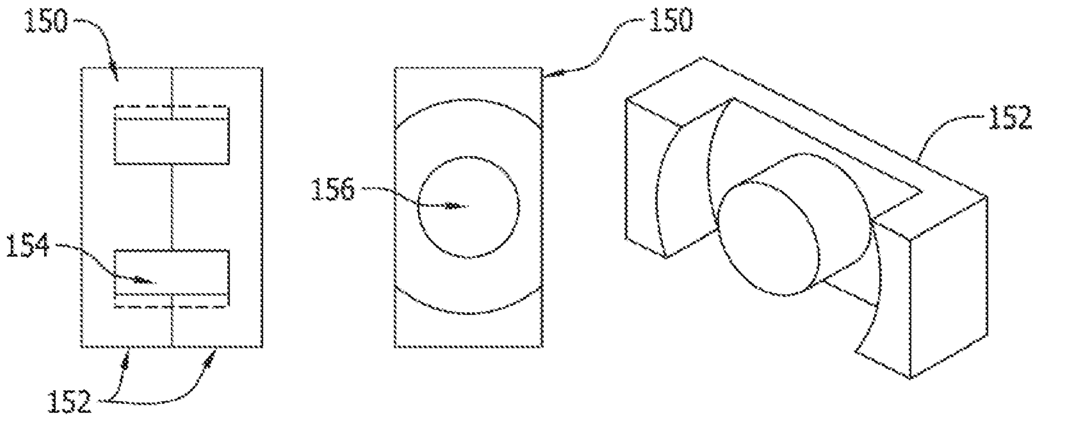
FIGS. 5A, 5B and 5C depict an exemplary magnetic core configuration in plan view in FIG. 5A, cross sectional view in FIG. 5B and in perspective view in FIG. 5C that may be utilized in an electromagnetic inductor component formed in accordance with an exemplary embodiment of the invention and including an improved conductivity composite conductor material.

FIGS. 5A, 5B and 5C depict an exemplary ER core configuration 150 in plan view (FIG. 5A) and including first and second core pieces 152 that are identically shaped but assembled in a reverse or mirror-image arrangement with respect to one another. The core pieces 152 may be fabricated from magnetic materials such as those described above. The ER core configuration 150 is shown in cross section in FIG. 5B and the core piece 152 is shown in perspective view (FIG. 5C). The ER core configuration 150 may be utilized in accordance with an exemplary embodiment of the invention when a composite, ultra-conductive wire (not shown in FIGS. 5A, 5B, 5C) is wound on the surface of the ER core configuration 150 to complete a coil in a known manner and provide an inductor component. Alternatively, a pre-formed coil may be provided and assembled with the core pieces 152 to complete the inductor component. The ER core configuration 150 in the example shown generally has a volume that is a function of Window Area (WA) where the coil is applied, Mean Length Per Turn (MLT) for the coil, and Cross-sectional Area (AC). FIG. 5A shows a Window Area 154 and a Cross-sectional Area 156 associated with the coil is shown in FIG. 5B.

An inductor component including the ER core configuration 150 shown in FIGS. 5A, 5B and 5C may be referenced to a reference inductor of a similar configuration, but having a copper-based coil, and is but one example of a type of inductor component that may benefit from the design approach described herein. The leads of the winding may be connected to terminal clips that may, in turn, be surface mounted to a circuit board. Alternatively, the leads of the winding formed on the core 150 may be through-hole mounted to a circuit board. In some embodiments, the winding formed on the core 150 need not connect to a circuit board at all, but rather may be terminated to external circuitry using known connections and techniques.

Figures 6A, 6B, 6C:
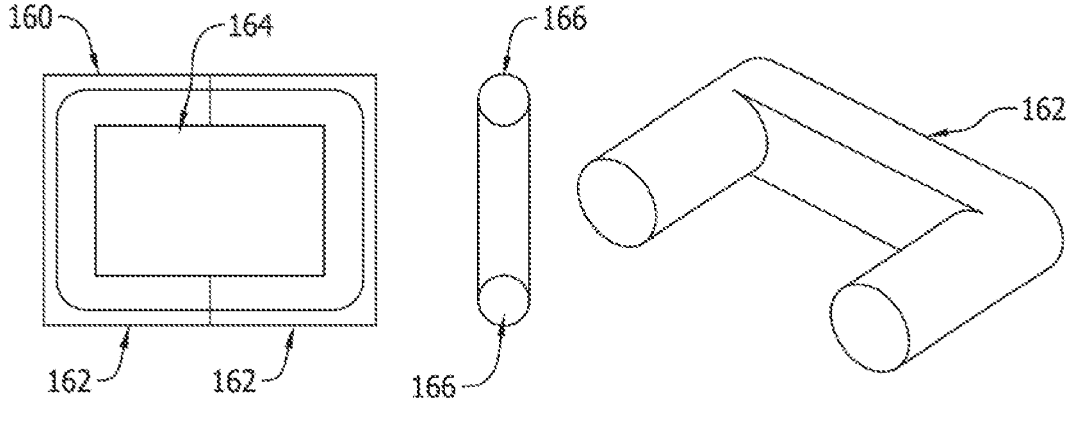
FIGS. 6A, 6B and 6C depict an exemplary magnetic core configuration in plan view in FIG. 6A, cross sectional view in FIG. 6B and in perspective view in FIG. 6C that may be utilized in an exemplary embodiment of an electromagnetic inductor component formed in accordance with an exemplary embodiment of the invention and including an improved conductivity composite conductor material.

Figured 6A, 6B and 6C depict an exemplary UU core configuration 160 in plan view (FIG. 6A) and including first and second core pieces 162 that are identically shaped but assembled in a reverse or mirror-image arrangement with respect to one another. The core pieces 162 may be fabricated from magnetic materials such as those described above. The UU core configuration 160 is shown in cross section in FIG. 6B and the core piece 162 is shown in perspective view (FIG. 6C). The UU core configuration 160 may be utilized in accordance with an exemplary embodiment of the invention when a composite, ultra-conductive wire (not shown in FIGS. 6A, 6B, 6C) is wound on the surface of the UU core configuration 160 to complete a coil in a known manner and provide an inductor component. Alternatively, a pre-formed coil may be provided and assembled with the core pieces 162 to complete the inductor component. The UU core configuration 160 in the example shown generally has a volume that is a function of Window Area (WA) where the coil is applied, Mean Length Per Turn (MLT) for the coil, and Cross-sectional Area (AC). FIG. 6A shows a Window Area 164 and a Cross-sectional Area 166 associated with the coil is shown in FIG. 6B.

An inductor component including the UU core configuration 160 shown in Figured 6A, 6B and 6C may be referenced to a reference inductor of a similar configuration, but having a copper-based coil, and is but one example of a type of inductor component that may benefit from the design approach described herein. The leads of the winding may be connected to terminal clips that may, in turn, be surface mounted to a circuit board. Alternatively, the leads of the winding formed on the core 160 may be through-hole mounted to a circuit board. In some embodiments, the winding formed on the core 160 need not connect to a circuit board at all, but rather may be terminated to external circuitry using known connections and techniques.

Figure 7A:
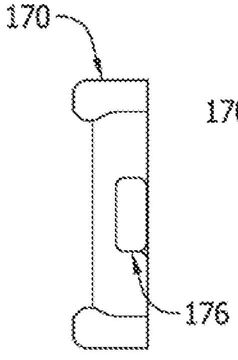
FIGS. 7A, 7B and 7C depict an exemplary magnetic core configuration in plan view in FIG. 7A, cross sectional view in FIG. 7B and in perspective view in FIG. 7C that may be utilized in an exemplary embodiment of an electromagnetic inductor component formed in accordance with an exemplary embodiment of the invention and including an improved conductivity composite conductor material.
Figure 7B:
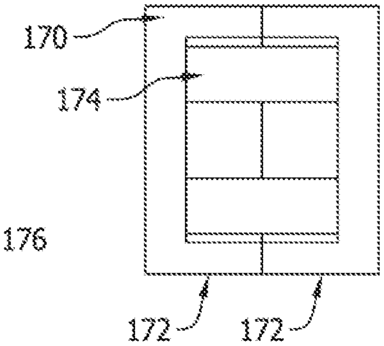
Figure 7C:
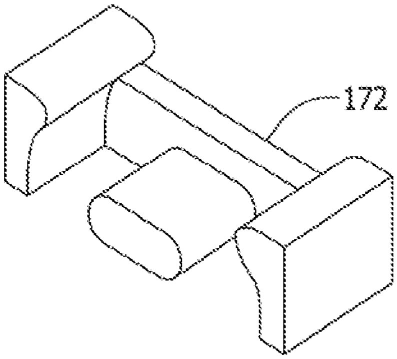

FIGS. 7A, 7B and 7C depict an exemplary EPC core configuration 170 in plan view (FIG. 7B) and including first and second core pieces 172 that are identically shaped but assembled in a reverse or mirror-image arrangement with respect to one another. The core pieces 172 may be fabricated from magnetic materials such as those described above. The EPC core configuration 170 is shown in cross section in FIG. 7A and the core piece 172 is shown in perspective view (FIG. 7C). The EPC core configuration 170 may be utilized in accordance with an exemplary embodiment of the invention when a composite, ultra-conductive wire (not shown in FIGS. 7A, 7B, 7C) is wound on the surface of the EPC core configuration 170 to complete a coil in a known manner and provide an inductor component. Alternatively, a pre-formed coil may be provided and assembled with the core pieces 172 to complete the inductor component. The EPC core configuration 170 in the example shown generally has a volume that is a function of Window Area (WA) where the coil is applied, Mean Length Per Turn (MLT) for the coil, and Cross-sectional Area (AC). FIG. 7B shows a Window Area 174 and a Cross-sectional Area 176 associated with the coil is shown in FIG. 7A.

An inductor component including the EPC core configuration 170 shown in FIGS. 7A, 7B and 7C may be referenced to a reference inductor of a similar configuration, but having a copper-based coil, and is but one example of a type of inductor component that may benefit from the design approach described herein. The leads of the winding may be connected to terminal clips that may, in turn, be surface mounted to a circuit board. Alternatively, the leads of the winding formed on the core 170 may be through-hole mounted to a circuit board. In some embodiments, the winding formed on the core 170 need not connect to a circuit board at all, but rather may be terminated to external circuitry using known connections and techniques.

Figure 8A:
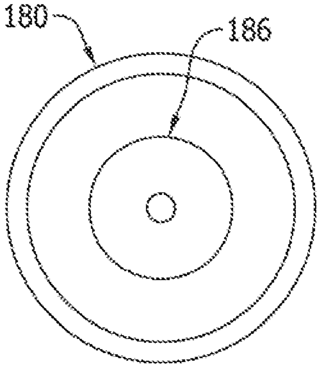
FIGS. 8A, 8B and 8C depict an exemplary magnetic core configuration in plan view in FIG. 8A, cross sectional view in FIG. 8B and in perspective view in FIG. 8C that may be utilized in an exemplary embodiment of an electromagnetic inductor component formed in accordance with an exemplary embodiment of the invention and including an improved conductivity composite conductor material.
Figure 8B:
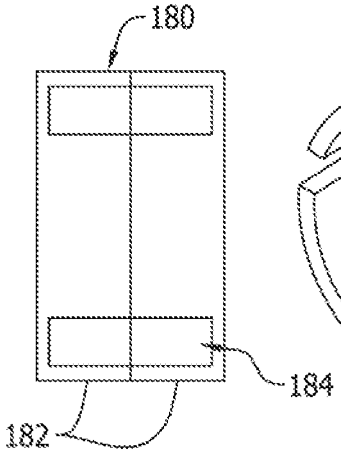
Figure 8C:
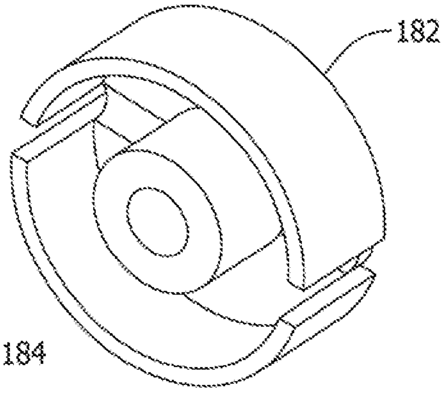

FIGS. 8A, 8B and 8C depict an exemplary PC core configuration 180 in plan view (FIG. 8B) and including first and second core pieces 182 that are identically shaped but assembled in a reverse or mirror-image arrangement with respect to one another. The core pieces 182 may be fabricated from magnetic materials such as those described above. The PC core configuration 180 is shown in cross section in FIG. 8A and the core piece 182 is shown in perspective view (FIG. 8C). The PC core configuration 180 may be utilized in accordance with an exemplary embodiment of the invention when a composite, ultra-conductive wire (not shown in FIGS. 8A, 8B and 8C) is wound on the surface of the EPC core configuration 180 to complete a coil in a known manner and provide an inductor component. Alternatively, a pre-formed coil may be provided and assembled with the core pieces 182 to complete the inductor component. The PC core configuration 180 in the example shown generally has a volume that is a function of Window Area (WA) where the coil is applied, Mean Length Per Turn (MLT) for the coil, and Cross-sectional Area (AC). FIG. 8B shows a Window Area 184 and a Cross-sectional Area 186 associated with the coil is shown in FIG. 8A.

An inductor component including the PC core configuration 180 shown in FIGS. 8A, 8B and 8C may be referenced to a reference inductor of a similar configuration, but having a copper-based coil, and is but one example of a type of inductor component that may benefit from the design approach described herein. The leads of the winding may be connected to terminal clips that may, in turn, be surface mounted to a circuit board. Alternatively, the leads of the winding formed on the core 180 may be through-hole mounted to a circuit board. In some embodiments, the winding formed on the core 180 need not connect to a circuit board at all, but rather may be terminated to external circuitry using known connections and techniques.

Figure 9A:
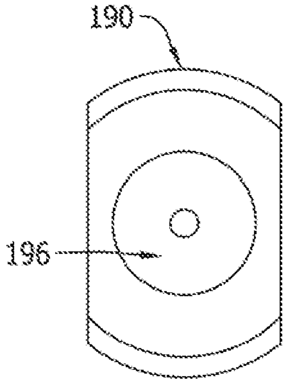
FIGS. 9A, 9B and 9C depict an exemplary magnetic core configuration in plan view in FIG. 9A, cross sectional view in FIG. 9B and in perspective view in FIG. 9C that may be utilized in an exemplary embodiment of an electromagnetic inductor component formed in accordance with an exemplary embodiment of the invention and including an improved conductivity composite conductor material.
Figure 9B:
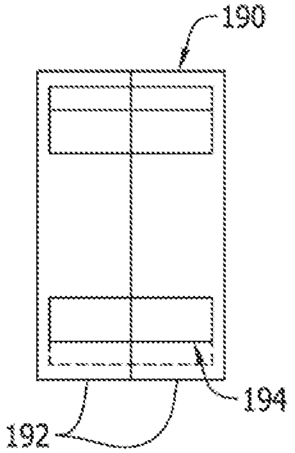
Figure 9C:
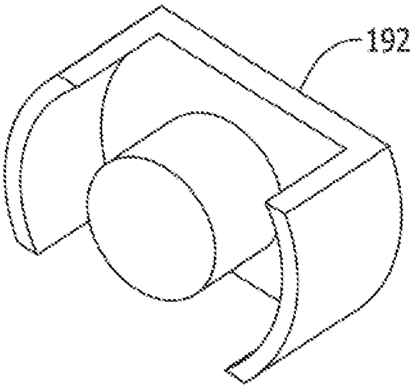

FIGS. 9A, 9B and 9C depict an exemplary DS core configuration 190 in plan view (FIG. 9B) and including first and second core pieces 192 that are identically shaped but assembled in a reverse or mirror-image arrangement with respect to one another. The core pieces 192 may be fabricated from magnetic materials such as those described above. The DS core configuration 190 is shown in cross section in FIG. 9A and the core piece 192 is shown in perspective view (FIG. 9C). The DS core configuration 190 may be utilized in accordance with an exemplary embodiment of the invention when a composite, ultra-conductive wire (not shown in FIGS. 9A, 9B, 9C) is wound on the surface of the EPC core configuration 190 to complete a coil in a known manner and provide an inductor component. Alternatively, a pre-formed coil may be provided and assembled with the core pieces 192 to complete the inductor component. The DS core configuration 190 in the example shown generally has a volume that is a function of Window Area (WA) where the coil is applied, Mean Length Per Turn (MLT) for the coil, and Cross-sectional Area (AC). FIG. 9B shows a Window Area 194 and a Cross-sectional Area 196 associated with the coil is shown in FIG. 9A.

An inductor component including the DS core configuration 190 shown in FIGS. 9A, 9B and 9C may be referenced to a reference inductor of a similar configuration, but having a copper-based coil, and is but one example of a type of inductor component that may benefit from the design approach described herein. The leads of the winding may be connected to terminal clips that may, in turn, be surface mounted to a circuit board. Alternatively, the leads of the winding formed on the core 190 may be through-hole mounted to a circuit board. In some embodiments, the winding formed on the core 190 need not connect to a circuit board at all, but rather may be terminated to external circuitry using known connections and techniques.

Figure 10A:
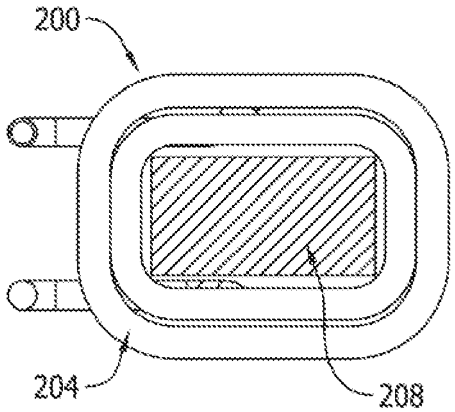
FIGS. 10A and 10B depict an exemplary embodiment of an electromagnetic inductor component including a magnetic core configuration in plan view in FIG. 10A, and in cross sectional view in FIG. 10B that may be utilized in an exemplary embodiment of an electromagnetic inductor component formed in accordance with an exemplary embodiment of the invention and including an improved conductivity composite conductor material.
Figure 10B:
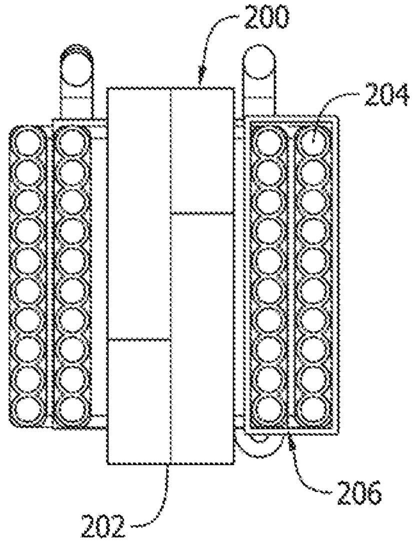

FIGS. 10A and 10B depicts an exemplary inductor component 200 including an I core 202 and a coil 204 fabricated from an ultra-conductive material such as that described above. The I core 202 may be fabricated from magnetic materials such as those described above. The composite, ultra-conductive wire is wound on the surface of the I core 202 for a number of turns to complete the coil 204. Alternatively, the coil 204 may be pre-formed and provided for assembly with the I core 202 to complete the inductor component 200. The I core 202 in the example shown generally has a volume that is a function of Window Area (WA) where the coil is applied, Mean Length Per Turn (MLT) for the coil, and Cross-sectional Area (AC). FIG. 10B shows a Window Area 206 and a Cross-sectional Area 208 associated with the coil 204 is shown in FIG. 10A.

The inductor component 200 including the I core 202 may be referenced to a reference inductor of a similar configuration, but having a copper-based coil, and is but one example of a type of inductor component that may benefit from the design approach described herein. The leads of the winding may be connected to terminal clips that may, in turn, be surface mounted to a circuit board. Alternatively, the leads of the winding formed on the core 202 may be through-hole mounted to a circuit board. In some embodiments, the winding formed on the core 202 need not connect to a circuit board at all, but rather may be terminated to external circuitry using known connections and techniques.

Figure 11:
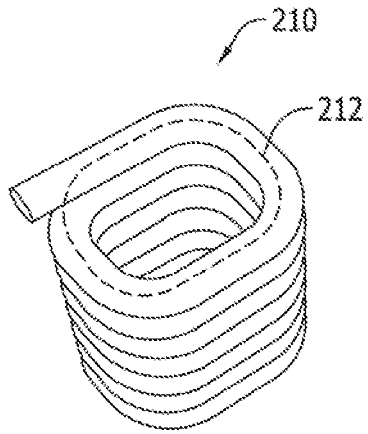
FIG. 11 is a perspective view of an exemplary coil configuration that may be utilized in an exemplary embodiment of an electromagnetic inductor component formed in accordance with an exemplary embodiment of the invention and including an improved conductivity composite conductor material.
Figure 12:
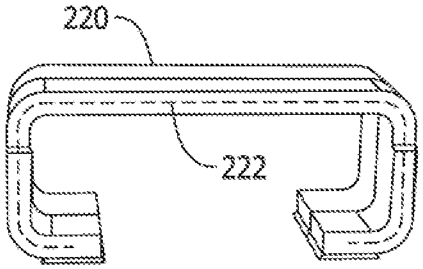
FIG. 12 is a perspective view of an exemplary coil configuration that may be utilized in an exemplary embodiment of an electromagnetic inductor component formed in accordance with an exemplary embodiment of the invention and including an improved conductivity composite conductor material.
Figure 13:
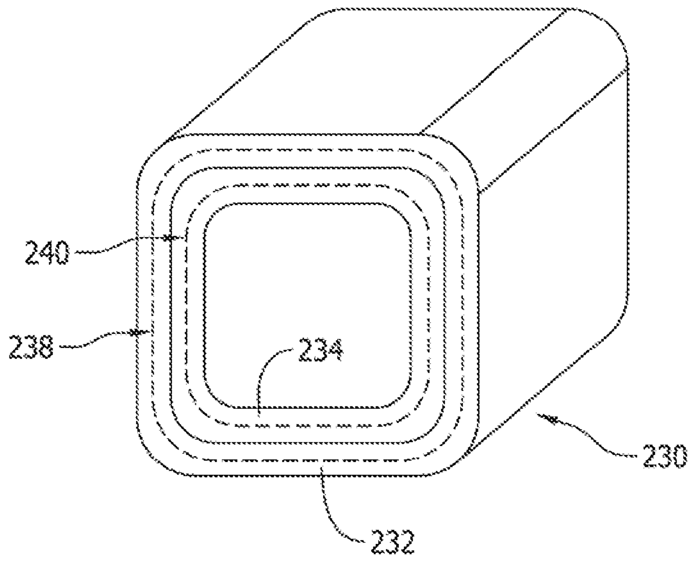
FIG. 13 is a perspective view of an exemplary coil configuration that may be utilized in an exemplary embodiment of an electromagnetic inductor component formed in accordance with an exemplary embodiment of the invention and including an improved conductivity composite conductor material.

FIGS. 11-13 depict Mean Length Per Turn (MLT) of various types of coil/winding geometries. The coil geometries shown can be used in combination with one or more of the core structures discussed above or with still other core structures in various embodiments.

FIG. 11 depicts a coil 210 fabricated from an ultra-conductive composite material and formed into a winding. The winding has an exemplary Mean Length Per Turn indicated by the hyphenated line and the reference character 212. In the example shown, the winding formed in the coil 210 includes seven full turns. As used herein a "turn" shall refer to a portion of a conductive path defined in the coil 210 that completes one full revolution of the conductive path in a loop. In the illustrated example, each turn, sometimes referred to as a loop, has a beginning and an end and has a generally rectangular shape with rounded corners. Where one turn ends the next turn begins, and the conductive paths repeat in a continuous fashion in the coil in the multiple turn configuration illustrated. As noted above, in general the greater number of turns that are provided in the winding 210, the greater inductance value for a component including the winding 210. Likewise, the fewer number of turns provided in the coil 210, the lesser the inductance value for a component including the coil 210. While seven turns are illustrated in the example shown in FIG. 11, greater or lesser values, including fractional values (e.g., 7½ or 7.5) turns are possible.

FIG. 12 depicts a C-shaped coil 220 defining a winding resembling those shown in FIGS. 1 and 2 that is fabricated from an ultra-conductive composite material and having an exemplary Mean Length Per Turn indicated by the hyphenated line and the reference character 222. It is seen in example of FIG. 12 that the winding of the coil 220 completes less than one full turn of a winding. When used in a surface mount component such as those shown in FIGS. 1 and 2, additional partial turns may be provided on the layout of the circuit board, such that when the coil 220 is connected to the partial turn on the circuit board, an increased number of turns is provided in the combination.

FIG. 13 depicts a multiple layer coil 230 that is fabricated from an ultra-conductive composite material. The coil 230 has a winding geometry including a first outer winding layer 232 and a second inner layer 234. The first layer 232 has an exemplary Mean Length Per Turn indicated by the hyphenated line and the reference character 236. The second layer 234 has an exemplary Mean Length Per Turn indicated by the hyphenated line and the reference character 240. Multiple turns can be provided in each of the first and second winding layers 232, 234.

It is understood that the core and coil configurations in the examples of FIGS. 1-13 are non-limiting and other core types and coil geometries can be utilized as desired without departing from the spirit of the invention. In some embodiments, coils may be deposited on a substrate layer and a winding pattern created on the substrate. Various patterns, shapes, or geometries of coil windings are possible including but not limited to spiral and serpentine winding shapes. Where multiple coils are provided, the coils may be overlapped with one another or spaced apart from one another.

In all of the embodiments described above, the coils are fabricated from an ultra-conductive composite material. The composite conductive material utilized may contains 1-99% by weight of carbon nanotubes (CNTs) along with metal or metal alloys, such as copper, copper alloys, aluminum, or aluminum alloys. The ultra-conductive coil conductor including the CNTs may include a metal or metal alloy core, and carbon nanotube (CNT) cladding. In contemplated embodiments, the conductivity of the composite material may be about 1.1 to about 10 times that of copper. The ultra-conductive material used to fabricate the coils can be made using any suitable process.

Figure 14:
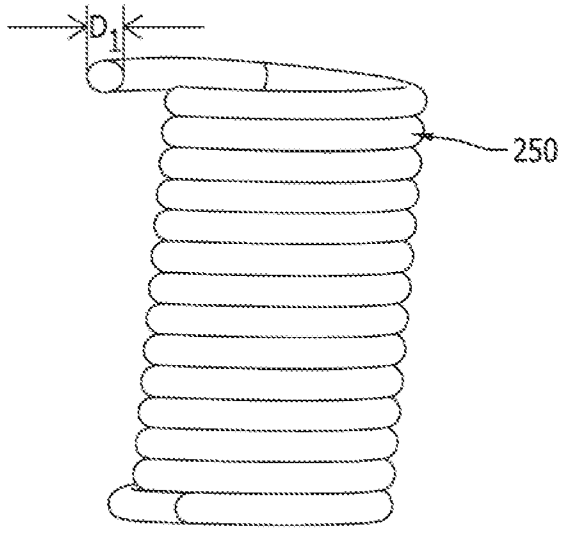
FIG. 14 is a perspective view of an exemplary coil configuration that may be utilized in an exemplary embodiment of an electromagnetic inductor component formed in accordance with an exemplary embodiment of the invention and including an improved conductivity composite conductor material.

Referring to FIG. 14, there is shown a coil 250 fabricated from a composite ultra-conductive conductor material and wound for a number of turns to complete a winding. As seen in FIG. 14 at one end of the coil 250, the conductor has a round or circular cross section including a diameter $D_1$. The diameter $D_1$ of the round wire may vary in different embodiments, and the cross sectional area of the conductor likewise varies with the selected diameter $D_1$. As mentioned above, the cross sectional area of the coil, in part, determines the inductance value of a component including the coil 250.

Figure 15:
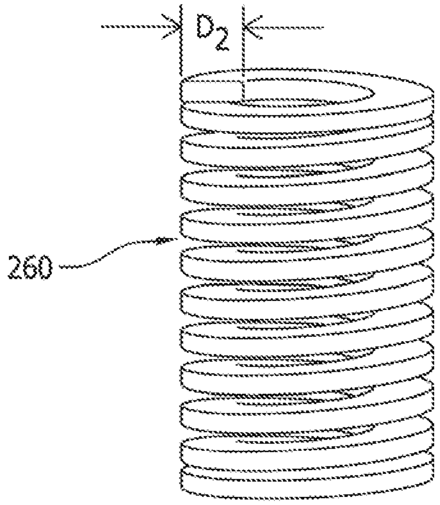
FIG. 15 is a perspective view of an exemplary coil configuration that may be utilized in an exemplary embodiment of an electromagnetic inductor component formed in accordance with an exemplary embodiment of the invention and including an improved conductivity composite conductor material.

FIG. 15 illustrates a coil 260 also fabricated from a composite ultra-conductive conductor material and wound for a number of turns to complete a winding. As seen in FIG. 15 at one end of the coil 260, the conductor has a rectangular cross section including a major dimension $D_2$. The conductor shown in the coil 260 is sometimes referred to as a flat wire coil, whereas the conductor shown in the coil 250 (FIG. 14) is referred to as a round wire coil. The dimension $D_2$ of the flat wire may vary in different embodiments, and the cross sectional area of the conductor likewise varies with the selected dimension $D_2$. As mentioned above, the cross sectional area of the coil, in part, determines the inductance value of a component including the coil 260.

If a coil wire has cross-sectional shape other than round, as shown in the example of FIG. 15, its effective "diameter" for purposes of the present invention shall be deemed to be the diameter of a round wire with equivalent cross-sectional area. As one example, if the major dimension $D_2$ has a value (e.g., 6 in a unit length) in a given embodiment, and the minor dimension measured in a direction perpendicular to the major dimension $D_2$ in FIG. 15 has a value (e.g., 2 in the same unit length), the cross sectional area of the conductor is the product of these two values or 12 square units. A diameter of a circular cross section having the same 12 square units in cross sectional area can be computed by first finding the radius of a circular cross section using the following relationship for a circular cross section:

$$A=\pi r^2$$

where the diameter D of the circular cross section is equal to twice the radius r. In this example where A is 12 square units, the radius r can be computed and is seen to be 1.95.

The diameter of a round cross section having the area of 12 is therefore twice the radius (e.g., 1.95×2) or 3.9. The conductor shown in FIG. 15 having a rectangular cross sectional area of 12 square therefore has an "effective diameter" of 3.9 for purposes of the present invention.

Figure 16:
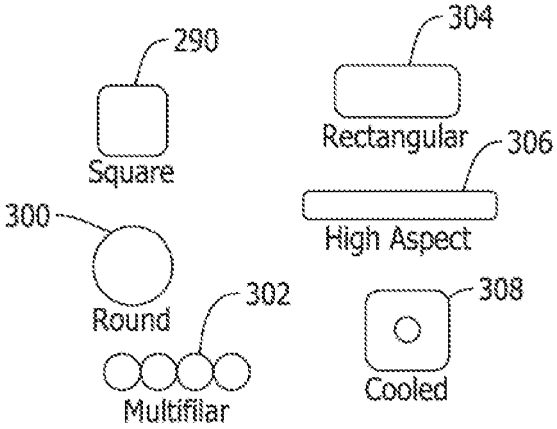
FIG. 16 illustrates a number of alternative cross sections of conductors that may be utilized to fabricate a coil in an exemplary embodiment of an electromagnetic inductor component formed in accordance with an exemplary embodiment of the invention and including an improved conductivity composite conductor material.

FIG. 16 shows additional cross sectional areas of ultra-conductive composite conductor materials that may be utilized to fabricate windings of a coil in electromagnetic components according to the present invention. In the examples shown in FIG. 16, the cross sections may be square as shown in the example conductor 290, round or circular as shown in the example conductor 300, multifillar as shown in the example conductor 302, rectangular as shown in the example conductor 304, a high aspect ratio cross section as shown in the example conductor 306, and a cooled cross section as shown in the example conductor 308. For each of these cross sections of conductors, an "effective diameter" can be computed in a similar manner to the example above. In the case of a round cross section such as in the conductor 300, the effective diameter is equal to the actual diameter of the round conductor.

Of course, the exemplary conductors and cross sections illustrated in FIG. 16 are exemplary only. Other conductors and cross sectional configurations are possible to construct coils for electromagnet inductor components in further and/or alternative embodiments of the invention. Coils may fabricated from such conductors to include any number of turns and/or arrangement of turns or layers. In multiple turn embodiments, a plurality of turns may be arranged concentrically with or without insulation in between. A plurality of coils may further be provided and may be electrically connected in series or in parallel. A plurality of coils may be arranged in a flux sharing relationship so that the coils are mutually coupled, or a plurality of uncoupled coils may be independently operable but nonetheless coupled to a common magnetic core structure.

Figure 17:
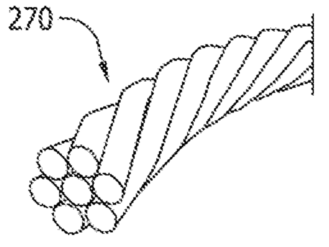
FIG. 17 illustrates an exemplary conductor that may be utilized to fabricate a coil in an exemplary embodiment of an electromagnetic inductor component formed in accordance with an exemplary embodiment of the invention and including an improved conductivity composite conductor material.

FIG. 17 illustrates a conductor 270 that may be fabricated from ultra-conductive composite materials and wherein multiple conductor strands are combined and twisted about one another to form a larger conductor 270. The conductor 270 may be provided as a length of wire that in turn may be wound for a number of turns to complete a coil having a mean length per turn (MLT) as discussed above. The example conductor 270 shown in FIG. 17 may be recognized as resembling a Litz wire or magnet wire, and the cross sectional area of the conductor 270 is equal to the sum of the cross sectional areas of the conductor strands. As such, in the illustrated example, seven conductor strands are utilized having the same circular cross sectional area, so the cross sectional area of the entire conductor is seven times the cross sectional area of the strands utilized. The effective diameter of the conductor for the purposes of the invention is then the diameter of a solid round wire with equivalent cross-sectional area of the conductor 270.

For example, if each strand has a cross sectional area of 2 square units and seven strands are utilized as shown, the conductor 270 has a cross sectional area of 14. Using the relationship above, the radius r of a circle having an area of 14 square units can be computed. In this example, the radius r is 2.11 and the diameter D is therefore twice the radius (e.g., 2.11×2) or 4.22. The conductor shown in FIG. 17 having a cross sectional are of 14 square units therefore has an "effective diameter" of 4.22 for purposes of the present invention.

Figure 18:
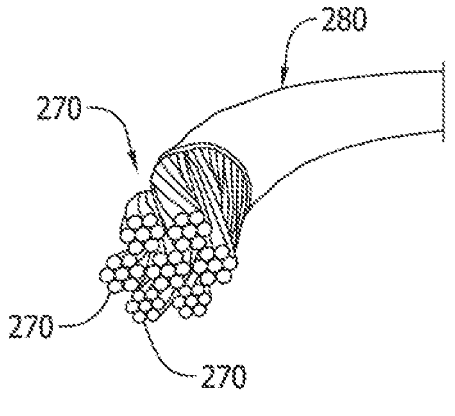
FIG. 18 illustrates an exemplary conductor that may be utilized to fabricate a coil in an exemplary embodiment of an electromagnetic inductor component formed in accordance with an exemplary embodiment of the invention and including an improved conductivity composite conductor material.

FIG. 18 illustrates a conductor 280 that may be fabricated from ultra-conductive composite materials and wherein multiple conductor strands are combined and twisted about one another to form a larger conductor 280. The conductor 280 may in turn be wound for a number of turns to complete a winding in a coil having a mean length per turn (MLT) as discussed above. The example conductor 280 shown in FIG. 18 may be recognized as a combination of conductors such as that shown in FIG. 17, and the cross sectional area of the conductor 280 is equal to the sum of the cross sectional areas of the conductors 270. As such, in the illustrated example, seven conductors 270 are utilized to fabricate the conductor 280.

Continuing the example above, if each conductor 270 has a cross sectional area of 14 square units (2 square units per strand times seven strands), the cross sectional area of the entire conductor 280 is seven times the cross sectional area of the conductor strands (e.g., 7 times 14 or 98 square units). The effective diameter of the conductor for the purposes of the invention is then the diameter of a solid round wire with equivalent cross-sectional area of the conductor 280. Using the relationship above, the radius r of a circle having an area of 98 square units can be computed. In this example, the radius r is 5.59 and the diameter D is therefore twice the radius r (e.g., 5.59×2) or 11.18. The conductor 280 shown in FIG. 18 having a cross sectional are of 98 square units therefore has an "effective diameter" of 11.18 for purposes of the present invention.

In accordance with an embodiment of the present invention, the actual effective diameter of the conductor utilized to fabricate the coil(s) from composite ultra-conductive materials such as that described above including CNTs is dependent on the relative conductivity of the composite conductive material and is preferably within a range of about 1.0 to about $(1/\beta)^{1/2}$ where $\beta$ is a ratio of the conductivity of the composite conductive material to a conductivity of a reference material such as copper. For instance, if the conductivity of the composite conductive material ($\beta$) used to fabricate the coil(s) is two times that of copper, the effective diameter of the conductor fabricated from the composite material may range from about 0.707 to about 1.0 of the effective diameter of a copper-based coil. In other words, by using the composite ultra-conductive conductor material the effective diameter of the conductor can be reduced relative to a copper conductor to any value from 1 to 0.707 in this example, where "1" represents the effective diameter of the copper conductor. Thus, the composite conductor material can facilitate a significant reduction in the size of the coil, which in turn may facilitate a significant reduction in the size of the magnetic core structure. A significant reduction in the overall size of an electromagnetic inductor component may be realized.

A reduction in the effective diameter of the conductor utilized to fabricate the coil, made possible by the greater conductivity of the conductive material utilized, also may impact the number of turns required to obtain a desired inductance value and/or other performance parameters and attributes associated with inductor components shown in FIGS. 1 and 2 and inductors fabricated from the other core structures and coil configurations described above. Of course, if the effective diameter of the coil conductor may be reduced by virtue of greater conductivity of composite conductive materials, and the number of turns can also be reduced, even more significant size reductions in electromagnetic components such as inductors is possible.

In order to achieve these benefits, in one aspect the present invention utilizes a design approach referencing an existing or established electromagnetic inductor component having certain attributes. That is, reference may be made to a reference inductor that has a reference core fabricated from a selected magnetic material and a reference coil fabricated form a conventional metal material such as copper or copper alloy in one example. The conductivity of the copper material may be deemed a reference value of 1. Except as noted below. it is to be understood that the reference inductor and the inductor of the present invention have otherwise identical core shapes whether fabricated from the same magnetic materials as the core of the reference inductor. For instance, if the inductor of the present invention has a toroid shaped core then the reference inductor is assumed to have a toroid shaped core fabricated from the same magnetic material. For the sake of the present description, any parameter preceded by the word "reference" shall mean the corresponding parameter associated with the reference inductor, unless specified otherwise.

In accordance with contemplated embodiments of the present invention, a ratio of conductivity (simply referred to as conductivity ratio (β) in the rest of the specification) of the composite ultra-conductive material utilized to fabricate the conductor of the coil of the present invention, relative to that of the conductive material utilized to fabricate the coil of the reference inductor (e.g., copper) defines a range of effective diameter of the coil conductor. Alternatively, the conductivity ratio (β) defines a range of a ratio of effective diameter of the coil cross section of the present invention relative to that of the reference inductor's effective diameter of the coil cross section. This ratio of effective diameters will be simply referred to as a "diameter ratio" or (δ) in the rest of description. Further, for a given value of diameter ratio (δ) and conductivity ratio (β) of the composite conductive material utilized relative to the conductive material utilized in the reference inductor, some of the parameters of the inductor of the present invention, such as inductance (L), direct current Resistance (DCR), core volume (V), and saturation current ($I_{SAT}$), can be adjusted to achieve a desired performance improvement. The word "adjusted" as used herein shall include the selection, alteration, variation or deviation from the respective reference parameters of the reference inductor. However, in certain embodiments, as will become apparent, such adjustments have to be made by keeping at least one of the parameters constant.

In accordance with embodiments of the present invention, if the conductivity of composite material used in the coil conductor is β times that of a reference copper conductor of the reference inductor, then the diameter ratio (δ) may be adjusted within a range of 1 to $\beta^{-1/2}$. In one example, within a sub-range (1 to $\beta^{-1/4}$) of the entire range 1 to $(1/\beta)^{1/2}$, by keeping the saturation current ($I_{SAT}$) equal to the saturation current of the reference inductor, the values of core volume (V), DC Resistance (DCR), inductance (L), number of turns (N) in the coil winding, and effective permeability (μ) can be adjusted to obtain desired values. The desired values of Inductance (L), DC Resistance (DCR), Core Volume (V), effective permeability of the core (μ), and number of turns (N) in the winding are adjustable within regions having upper limits defined by functions ($\delta^{-2}$), [$\beta^{(-1)}*\delta^{(-4)}$], 1, $\delta^{2/3}$, $\delta^{(-2)}$ and lower limits defined by functions 1, [$\beta^{(-1)}*\delta^{(-2)}$], ($\delta^2$), ($\delta^2$), ($\delta^{(-2/3)}$), respectively. It must be noted that the regions of improvement, wherein the desired values can be adjusted, are envisaged in relation to respective values of the same reference parameters.

Figure 19:
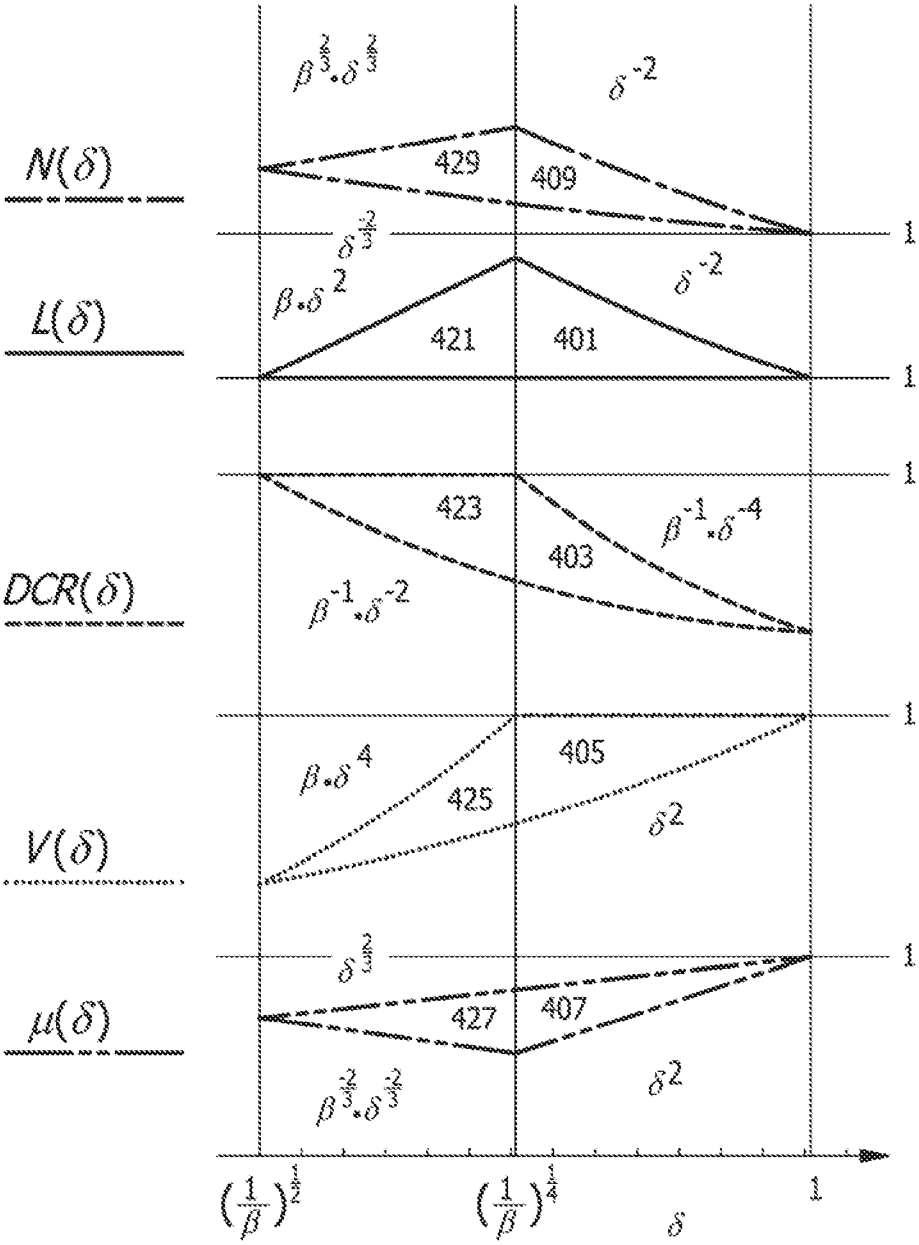
FIG. 19 is an exemplary inductor design graph showing optimal regions of performance improvement for an exemplary embodiment of an electromagnetic inductor component formed in accordance with an exemplary embodiment of the invention and including an improved conductivity composite conductor material.

The limits and functions referred to above are derived from relationships illustrated in graphical form in FIG. 19. In FIG. 19, the diameter ratio (δ) is plotted along the x-axis. Since the conductivity ratio (β) relates to the diameter ratio (δ), the values of the diameter ratio (δ) are shown in reference to a function of the conductivity ratio (β). Exemplary component parameters are plotted along the y-axis as functions of the diameter ratio (δ).

FIG. 19 shows a first bounded region of performance improvement in terms of inductance 401 as a function of diameter ratio (δ) that may be utilized in the inductor design and fabrication approach of the present invention. The region 401 shown in FIG. 19 is shown to be bounded by broken lines that are respectively derived from theoretical relationships and computation using the variables (β) and (δ), and as shown in FIG. 19 the region 401 is defined by an upper boundary value defined by the function $\delta^{(-2)}$ and a lower boundary value of 1. It is apparent that a desired value of diameter ratio (δ) for an inductor component of the present invention can be any value within these boundaries to provide an inductor having an increased inductance value (or the same inductance value if the conductivity ratio (β) is nearly 1) as the reference inductor.

However, if the diameter ratio (δ) is selected to be outside the limits of the bounded region 401 shown (i.e., outside the broken lines that bound the region 401), the inductance of the resultant component will be lower than the inductance value of the reference inductor. That a higher conductivity composite material may be utilized to provide an inductor with a lower inductance value than the reference inductor utilizing a conventional conductive material having a lower conductivity (but otherwise similar design) is perhaps a counterintuitive result that is preferably avoided. Thus, the bounded region 401 provides a range of values, within and including the boundaries shown in which the inductance value of an inductor component of the present invention constructed with values (β) and (δ) is the same or better in terms of its inductance value than the inductance value of the reference inductor.

Similarly, additional bounded design improvement regions 403, 405, 407, and 409 are shown in FIG. 19 showing respective regions of performance improvement in terms of direct current resistance (DCR), Core Volume (V), number of turns (N) of the winding, and effective permeability (μ). The bounded regions 403, 405, 407, and 409 shown in FIG. 19 are derived from theoretical relationships and computation using the variables (β) and (δ). It is apparent that a desired value of diameter ratio (δ) (which relates to the conductivity ratio (β)) can be any value within these bounded regions 403, 405, 407, and 409 to provide an inductor of the present invention having improved values relative to the reference inductor. If the diameter ratio (δ) is selected to be outside the boundaries of the respective bounded regions 403, 405, 407, and 409 shown, the resultant component including the higher conductivity composite material will not be improved relative to the reference inductor for the respective parameters of direct current resistance (DCR), Core Volume (V), number of turns (N) of the winding, and effective permeability (μ). Again, such results are perhaps counterintuitive and are preferably avoided. The bounded regions 401, 403, 405, 407, and 409 provide a range of values between and including the boundary lines, within the limits shown in which the inductance value of a component of the invention constructed with values (β) and (δ) is the same or better in terms of its inductance value than the reference inductor.

The reader may recognize that the bounded regions 401, 403, 405, 407, and 409 shown in FIG. 19 may be superimposed to define still other regions wherein, if values of the diameter ratio (δ) are selected within those regions, more than one of the parameters for each respective region shown will be improved relative to the reference inductor. Using such bounded regions, inductor performance in an inductor of the present invention may be substantially optimized with respect to multiple performance parameters in reference to the reference inductor. Alternatively stated, inductor components may be constructed that simultaneously offer improved performance relative to the reference inductor across multiple parameters. Equal or better performance across various combinations of parameters is facilitated as described further below in relation to contemplated examples.

In accordance with contemplated embodiments of the present invention, within a sub-range ($\beta^{-1/4}$ to $\beta^{-1/2}$) of the entire range $1-(1/\beta)^{1/2}$ of the diameter ratio ($\delta$) shown in FIG. 19, by keeping the saturation current ($I_{SAT}$) equal to the saturation current of the reference inductor, the values of core volume (V), DC Resistance (DCR), inductance (L), number of turns (N) in the winding, and effective permeability ($\mu$) can be adjusted to obtain desired values. The desired values of Inductance (L), DC Resistance (DCR), Core Volume (V), effective permeability of the core ($\mu$), and number of turns (N) are adjustable as shown in FIG. 19 within respective bounded regions 421, 423, 425, 427 and 429 shown with respective broken lines and having upper limit values defined by respective functions [$\beta*\delta^2$], 1, [$\beta*\delta^{(4)}$], $\delta^{2/3}$, [$\beta^{(2/3)}*\delta^{(2/3)}$] and lower limit values defined by respective functions 1, [$\delta^{(-1)}*\delta^{(-2)}$], ($\delta^2$), [$\beta^{(-2/3)}*\delta^{(-2/3)}$], ($\iota^{(-2/3)}$). It must be noted that the bounded regions of improvement shown, wherein the desired values can be adjusted to achieve different ranges of performance with respect to the parameters illustrated, are envisaged in relation to respective values of the same reference parameters.

Referring still to FIG. 19, within the bounded regions 403 and 423, the DC Resistance (DCR) appears to be increasing with decreasing effective diameter shown on the x-axis. It must be appreciated, however, that when the effective diameter of a conductor fabricated from composite conductive material having improved conductivity as explained earlier (relating to the diameter ratio ($\delta$)) decreases in comparison to that of the reference inductor, the DC Resistance (DCR) never exceeds that of the reference inductor (which is considered to be 1 in this example). Therefore, DC Resistance (DCR) of the component of the invention still remains lower than the reference inductor and offers performance improvements in other parameters such as core volume, inductance, etc.

In accordance with the embodiments described above, it is assumed that when the core volume (V) is improved (i.e., reduced) such improvement happens proportionally for all the sides or dimensions of the core structure (i.e., all the dimensions of the magnetic core structure shrink proportionally while the core structure shape and contour remains the same. In other words, the three dimensions of core volume that is Window Area (WA), Mean Length Per Turn (MLT), and Cross sectional Area (AC), as shown in the preceding figures, proportionally change with any change in core volume (V).

In certain embodiments, however, there exists a possibility where only the height of the Window Area (WA) would change and Mean Length Per Turn (MLT), and Cross-sectional Area (AC) would not change. In such case the Inductance (L) and DC Resistance (DCR) will have the improvements as shown in FIG. 19 and the height of the Window Area (WA) will be adjustable within the same region of values as Core Volume shown in FIG. 19. However, there will be an impact on the number of turns (N) and effective permeability ($\mu$) as explained in the following paragraphs and illustrated in relation to FIGS. 31-35.

As seen in FIGS. 31-35, for a diameter ratio ($\delta$) in the sub-range (1 to ($\beta^{-1/4}$) of the entire range $(1-(1/\beta)^{1/2})$ shown in FIG. 19 and at the saturation current ($I_{SAT}$) equal to the saturation current of the reference inductor, the number of turns (N) in the coil winding and effective permeability ($\mu$) of the core have a different region of performance improvement than indicated in FIG. 19, where the desired values of these parameters can be obtained. The desired values of effective permeability of the core ($\mu$), and number of turns (N) are adjustable within regions having upper limit values defined by functions 1, [$\delta^{(-2)}$] and lower limit values defined by functions [$\delta^{(2)}$], 1, respectively.

Similarly, and as also illustrated in FIGS. 31-35, for diameter ratio ($\delta$) within the sub-range ($\beta^{-1/4}$ to $\beta^{-1/2}$) of the entire range $1-(1/\beta)^{1/2}$ and at the saturation current ($I_{SAT}$) equal to the reference saturation current, the desired values of the effective permeability of the core ($\mu$), and number of turns (N) can be adjusted in different bounded regions. The desired values of effective permeability of the core (p), and number of turns of (N) in the winding are adjustable within bounded regions having upper limits defined by functions 1, [$\beta*\delta^{(2)}$] and lower limits defined by functions [$\beta^{(-1)}*\delta^{(-2)}$], 1, respectively.

Figure 20:
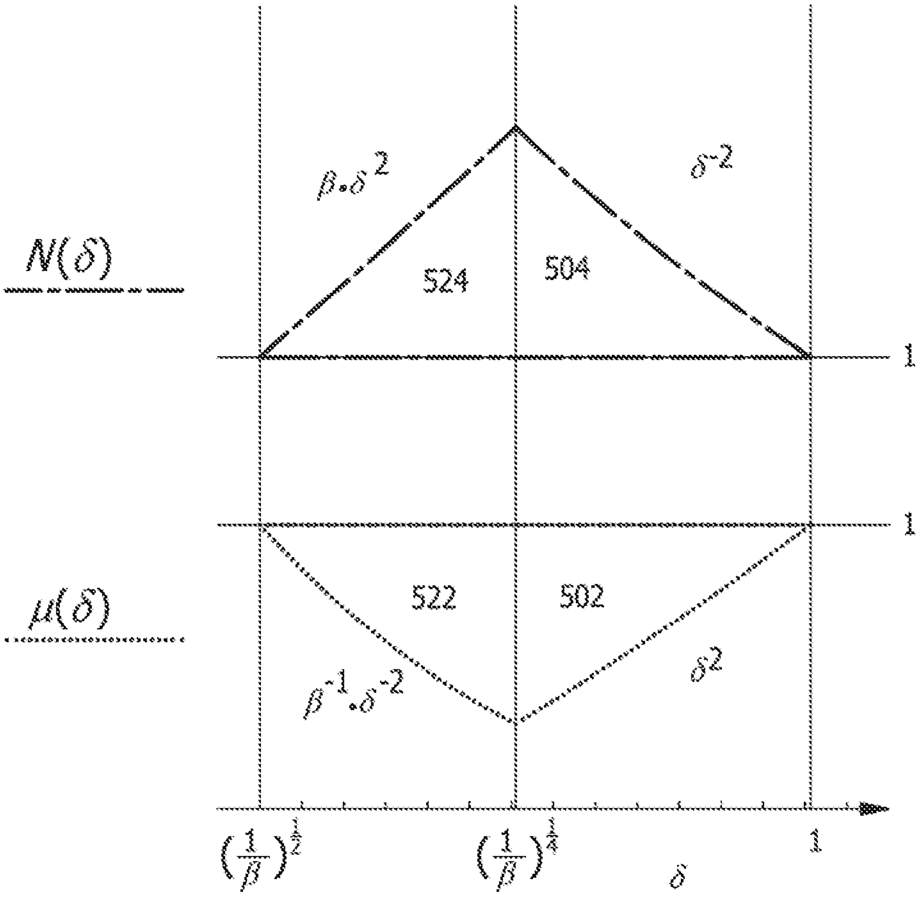
FIG. 20 is another exemplary inductor design graph showing optimal regions of performance for an exemplary embodiment of an electromagnetic inductor component formed in accordance with an exemplary embodiment of the invention and including an improved conductivity composite conductor material.
Figure 34:
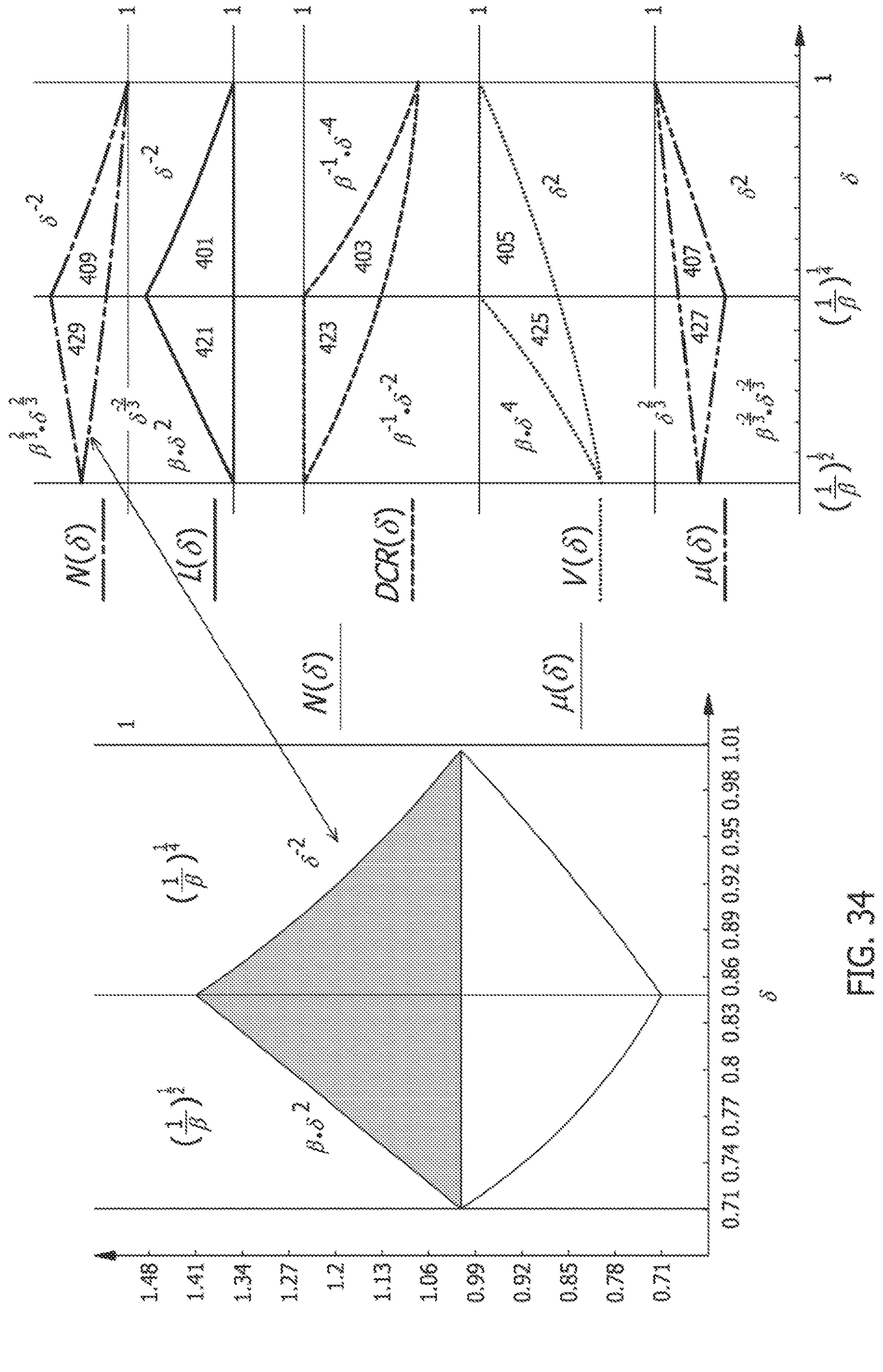
FIG. 34 is another graphical illustration highlighting a fourth one of multiple design improvement regions for the inductor component formed in accordance with aspects of FIGS. 31-33.
Figure 35:
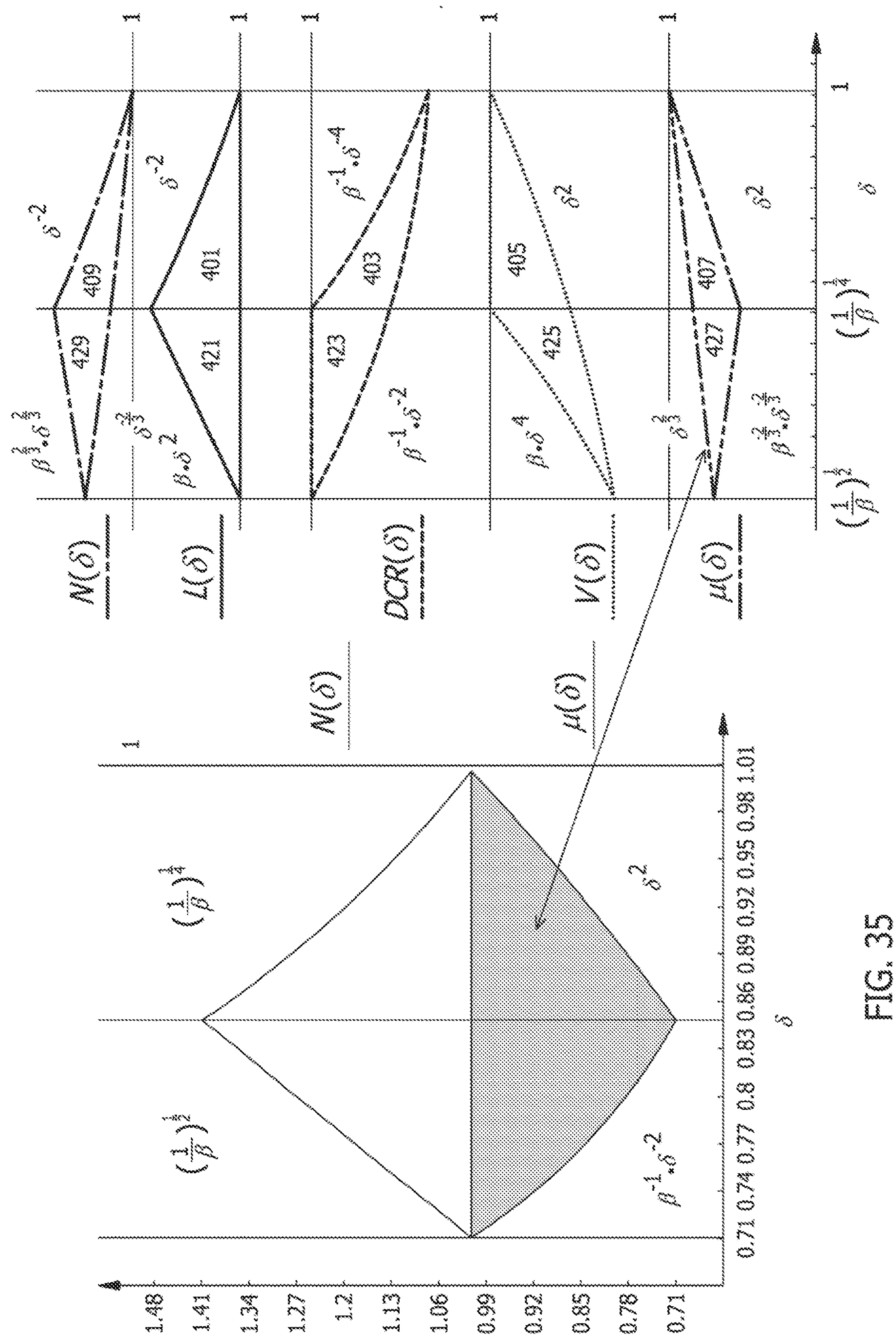
FIG. 35 is a view similar to FIG. 34 but illustrating a fifth one of multiple design improvement regions for the inductor of the invention.

FIG. 20 shows a bounded region of performance improvement 502, 522 in terms of effective permeability of the core defined with a first set of broken lines, and bounded regions of performance improvement 504, 524 in terms of the number of turns of coil wire shown with a second set of broken lines for two different diameter sub-ranges mentioned above. It should be understood that these bounded regions shown in FIG. 20, and also FIGS. 34-35, are different than the bounded regions when variation in core volume happens proportionally for all dimensions.

Figure 21:
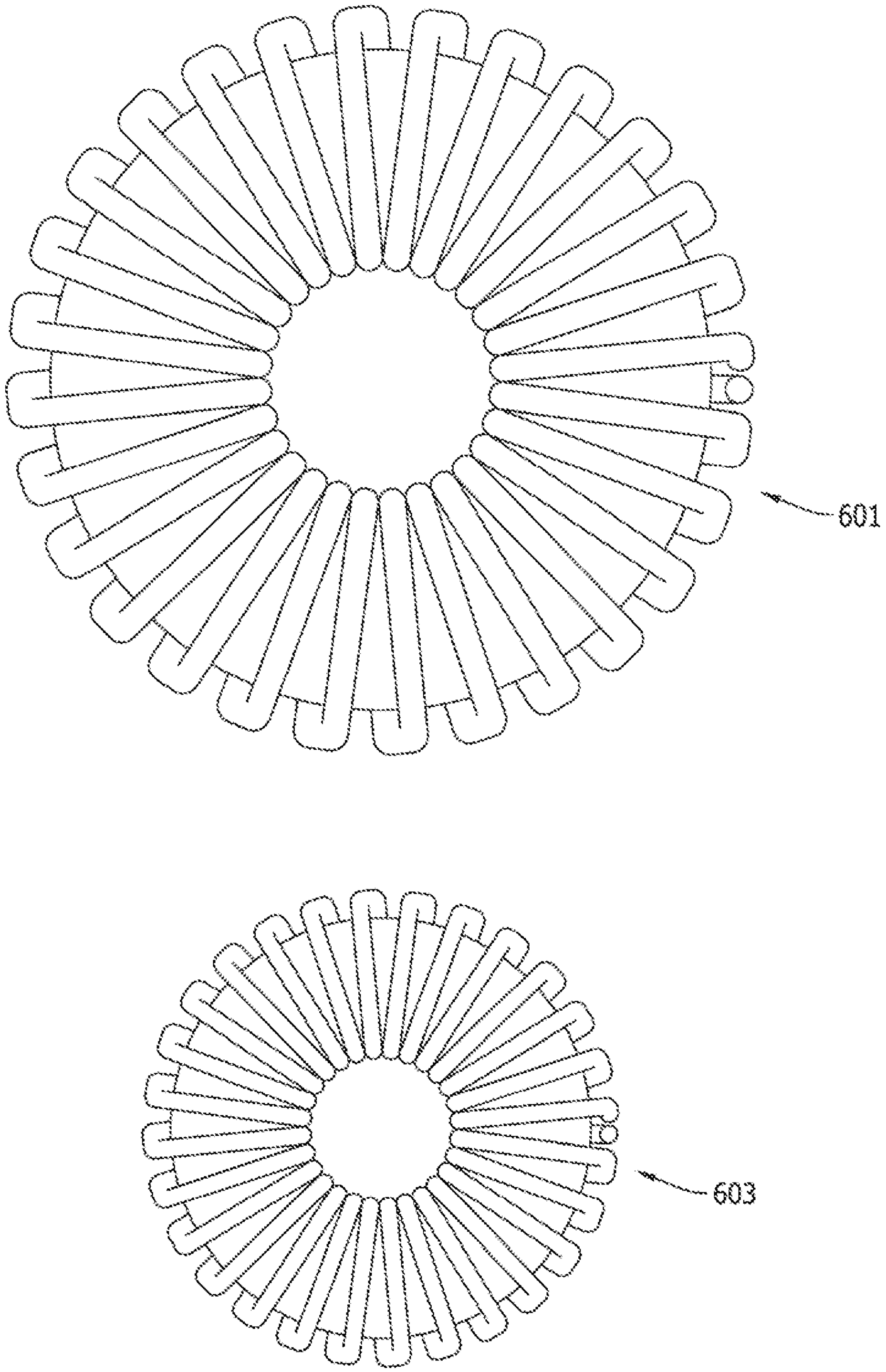
FIG. 21 illustrates a comparative size reduction of an exemplary embodiment of an electromagnetic inductor component formed in accordance with an exemplary embodiment of the invention versus a conventional inductor component of a similar configuration and including an improved conductivity composite conductor material.

As illustrated in FIG. 21, the proposed invention improves the overall performance of an exemplary inductor component according to the invention in relation to a reference inductor, where by using coil wire made of composite material having carbon nanotubes and by keeping fixed at least one of the parameters of the inductor in relation to the reference inductor, other parameters can be improved. The technical advantages of the invention in terms of overall size reduction is apparent in FIG. 21, where the inductor 603 of the invention including the higher conductivity composite material coil wire is dimensionally much smaller than the reference inductor 601 which has conventional coil wire made of copper. Reductions in size are likewise possible utilizing any of the other core structures and coil configurations described above.

Referring to FIG. 22, there is shown a table representing inductor component improvements for a set of inductors in terms of DC Resistance (DCR), Inductance (L), for a fixed value of Saturation current $I_{SAT}$ and core size when higher conductivity composite conductive material is used to fabricate the coil/winding in the inductor. In the examples shown, a composite conductive material having a conductivity that is twice the conductivity of copper is assessed to evaluate possible performance improvements. That is, the examples shown in FIG. 22 demonstrate the benefits of utilizing a composite conductive material having a conductivity ratio ($\beta$) of 2. As the preceding description makes clear, however, other conductivity ratios ($\beta$) are possible and may likewise be beneficially used with different results than that shown.

In the table of FIG. 22, the first column 700 tabulates attributes of a number of conventionally formed inductor components identified by part number at the left-hand side. In the example shown, a number of Coiltronic SD3110

Series Low Profile Power Inductors are shown having different ratings. Such inductors are commercially available from Eaton Electronics (www.Eaton.com) (formerly Cooper Bussmann Electronics) and have a known configuration. The low profile SD3110 Series power inductors may be utilized in exemplary, non-limiting applications such as cellular phones, digital cameras, compact disc players, media player devices, personal digital assistant (PDA) devices, liquid crystal displays, light emitting diode (LED) driver and flash circuits, hard disk drives, backlighting, and electroluminescent (EL) panels. Further, the SD3110 Series power inductors are miniaturized components including surface mount terminations for circuit board applications. The SD3110 Series power inductors have a package size of 3.1 mm by 3.11 mm by 1.0 mm.

Inductance values (L), saturation current values ($I_{SAT}$), and direct current resistance values (DCR) are shown in the first column 700 for the SD3110 Series power inductor components listed. The SD3110 Series power inductors tabulated in the first column 700 include conductors fabricated from copper that are, in turn, used to define windings completing a number of turns in the SD3110 Series power inductor components. In other words, the column 700 lists a number of "reference inductors" and associated values for purposes of the present invention. The SD3110 Series power inductors represent one type of a reference inductor for which performance improvements are believed to have peaked when copper conductors are used to fabricate the coils and windings. Of course, other reference inductors having different coils are possible and may instead be utilized for purposes of the present invention.

The second column 702 shown in the Table of FIG. 22 includes corresponding attributes of a first set of inductor components formed in accordance with the present invention, but in reference to the SD3110 Series power inductor components tabulated in the first column 700. The corresponding values of the first set of inductor components formed in accordance with the present invention are calculated according to the teachings above and tabulated in the column 702. Comparing the rows of the columns 700 and 702, it is seen that the inductor components are provided in the first set of components in the column 702 have the same inductance values as the reference inductors tabulated in the column 700 and also the same ($I_{SAT}$) values as the reference inductors tabulated in the column 700. The first set of inductors shown in the column 702, however, have a 50% reduction in DCR values relative to the reference inductors tabulated in the column 700.

As seen at the bottom of the second column 702, these results for the first set are obtained using an effective diameter conductor that is the same as the effective diameter of the reference inductors in the column 700 (i.e., the diameter ratio (δ) has been selected to equal 1). The effective permeability value (μ) is also selected to have a value of 1 in the first set shown in the column 702. As a result, inductors of the first set may be provided that include the same core construction and gap as the set of reference inductors, and maintain the same package size as the reference SD3110 Series power inductor of the same rating. The first set of inductors shown in the column 702, however, have dramatically better DCR performance relative to the reference inductors in column 700 by virtue of the improved conductivity of the composite conductive material utilized to fabricate the coils in the first set.

The third column 704 shown in the Table of FIG. 22 tabulates calculated values of a second set of inductor components formed in accordance with the present invention. Comparing the rows of columns 700 and 704, it is seen that the inductor components of the second set shown in the column 704 have significantly greater (about 50% greater in the embodiments tabulated) inductance values than the reference inductors (e.g., the SD3110 Series power inductors) that are tabulated in the column 700, while maintaining the same ($I_{SAT}$) values as tabulated in the column 700, and the same DCR values relative to those tabulated in tabulated in the column 700. As seen at the bottom of the third column 704, these results for the second set are obtained using an effective diameter conductor that is 84% of the effective diameter of the reference inductors in the column 700. The air gap in the second set of components is enlarged to provide an effective permeability value (μ) of 0.707. The reduction in effective diameter allows the air gap to be enlarged while maintaining the same package size as the reference SD3110 Series power inductors shown in the column 700.

The fourth column 706 shown in the Table of FIG. 22 tabulates calculated values of a third set of inductor components formed in accordance with the present invention. Comparing the rows of columns 700 and 706, it is seen that inductor components in the third set of column 706 have a significantly greater (about 23% greater in the embodiments tabulated) inductance values than the reference inductors tabulated in the column 700, the same ($I_{SAT}$) values as tabulated in the column 700, and significantly reduced DCR values (about 30% less) relative to those tabulated in the column 700 for the reference inductors. As seen at the bottom of the fourth column 706, these results are obtained using an effective diameter conductor that is 90% of the effective diameter of the reference inductors in the column 700, and a larger air gap is provided to provide an effective permeability value (μ) of 0.81.

The findings in the Table of FIG. 22 corroborate the bounded regions shown in FIG. 19. It is believed that similar results could be generated for other sets of reference inductors. It should now be evident from the results of FIG. 22 that improved inductors can be provided having the same package size with improved performance to the reference inductors, smaller package size with the same performance as the reference inductors, and various combinations of package sizes and different performance parameters that are not believed to be possible with the reference inductor including copper coils and windings.

Figure 23:
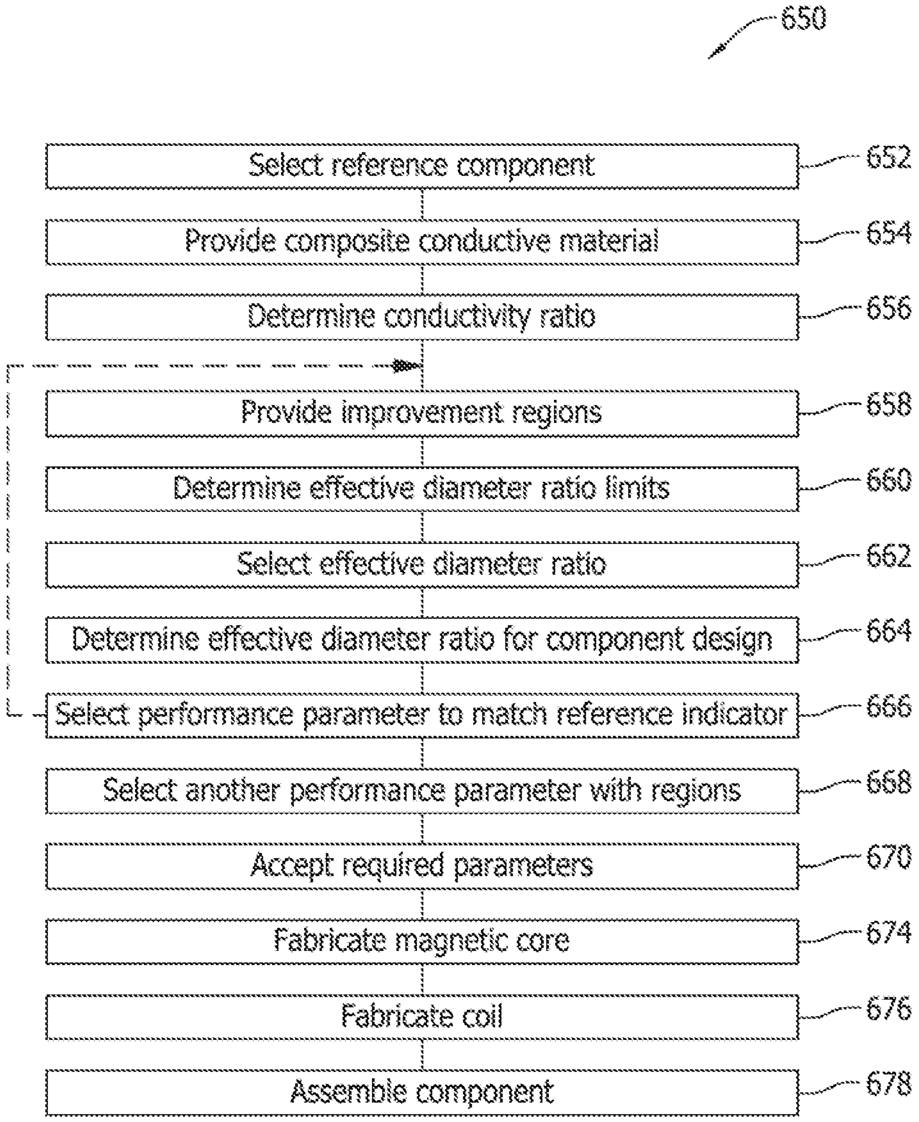
FIG. 23 illustrates an exemplary flowchart of a method of designing and manufacturing electromagnetic inductor components in accordance with exemplary embodiments of the present invention including an improved conductivity composite conductor material.

FIG. 23 illustrates an exemplary flowchart of a method 650 of manufacturing electromagnetic inductor components in accordance with exemplary embodiments of the present invention.

As shown at step 652, a reference inductor component is selected or identified. The reference inductor component selected or identified, as described above, includes a reference magnetic core, a reference conductor material from which a coil and winding is fabricated, and the reference inductor component may have a reference core size and a plurality of reference performance parameters selected from the group of an inductance value, an effective permeability, a saturation current value, and a direct current resistance value when connected to electrical circuitry. The reference inductor component may be a power inductor in one embodiment, and may include any of the coil and winding configurations described above and any of the core structures described above. The reference inductor component may include a conductor material such as copper, copper alloy, silver, silver alloy, aluminum, or aluminum alloy. The selection or identification of the reference component at step 652 may include selecting or identifying a single component or a set of reference components such as those illustrated in the Table of FIG. 22 and discussed above.

At step 654, a composite conductive material having a conductivity greater than a conductivity of the reference conductor material is provided. The composite material may be any material described above or another material of a greater conductivity than the conductor material utilized in the reference component(s). Varying degrees of conductivity may be provided by different formulations of composite materials. The composite materials may be provided in flexible wire form, sheet form, or in a form that may be deposited on a substrate material. In some embodiments, the step of providing the composite material at step 654 may include the step of manufacturing the composite conductive material. In other embodiments, the step of providing the composite material may include acquiring the material from another party, whether a manufacturer or a distributor, and making the composite material available for electromagnetic inductor component fabrication.

At step 656 a ratio is determined of electrical conductivity (β) of the composite conductor provided at step 654 to the electrical conductivity of the reference conductor material of for the reference inductor component selected at step 652. While illustrated as a separate step, step 656 and step 654 may in practice be one and the same in certain embodiments. That is, one may select the composite material provided at step 654 to achieve a desired conductivity ratio for purposes of step 656. Alternatively, a composite conductive material could be provided and analyzed to determine its conductivity, which can then be used to determine the conductivity ratio.

As shown at step 658, improvement regions such as those shown in FIGS. 19 and 20 may be provided. The regions, as explained above, may be derived from theoretical relationships and computation. The regions may be provided as a preparatory step to the method 650 or may be determined as part of the method and provided for reference in the fabrication of an electromagnetic inductor component including the material provided at step 654. The regions may be developed for each respective inductor component parameter such as those described in the embodiments above. The regions may be defined for each parameter of interest to include functions of the ratio of electrical conductivity (β) discussed above, which also relates to the effective diameter ratio (δ) as described above. The regions of values may be defined by a function of the ratio of electrical conductivity (β) and the effective diameter ratio (δ) as described above. It is understood that graphs such as those in FIGS. 19 and 20 may be helpful to do this, but are not strictly necessary for the improvement regions to be defined and utilized.

As shown at step 660, an upper limit and lower limit of an effective diameter of the composite conductive material may be determined based on the determined ratio of electrical conductivity (β). The upper and lower limits of the effective diameter may be determined in view of the regions provided at step 658 in one example. The upper and lower limits are determined from the perspective of identifying a range of values between the limits in which a component parameter may be improved relative to the reference inductor selected at step 652.

At step 662, an effective diameter within the determined upper and lower limit is selected. The effective diameter selection may be any value about equal to the upper and lower limit determined at step 660, or any value in between. The selected effective diameter value is made with an objective, as described above, of maintaining or improving a parameter of the reference component(s) selected at step 652. In some embodiments step 662 may be consolidated with steps 654 and 656. For example, only one composite conductor with a given effective diameter may be provided at step 654, such that the effective diameter at step 662 may be effectively dictated by the composite material provided.

At step 664, based on the selected effective diameter value at step 662, the effective diameter ratio of the conductor material provided is determined relative to the effective diameter of the reference component selected at step 652. As described above, the effective diameter ratio determined at step 664 may relate to a cross section of a conductor that is not round or circular in cross section.

At step 666, at least one component parameter may be selected to match a corresponding parameter of the reference component selected at step 652. For example, as described in some of the examples above, as well as some of the examples to follow, the saturation current ($I_{SAT}$) for the component design including the composite conductive material may be selected to match the saturation current ($I_{SAT}$) of the reference component selected at step 652. Alternatively, another parameter may be selected to match the corresponding of the reference component selected at step 652.

In at least some contemplated embodiments, and as shown in phantom in FIG. 23, the step 666 may optionally be performed prior to step 658. In such embodiments, the improvement regions provided at step 658 may be generated in view of the selected performance parameter at step 666. For example, if the saturation current is selected at step 666 in accordance with the examples described herein, the improvement regions and graphs described above may result. However, if another performance parameter or characteristic of the reference inductor is selected to match the reference inductor at step 666, the resultant improvement graphs and regions will be different from those illustrated described herein. As such, the design improvement regions described and illustrated herein are provided for discussion purposes only and are not required to practice the inductor design methodology and fabrication techniques of the invention to manufacture improved inductor component having the higher conductivity composite material.

It is understood, however, that multiple improvement regions and graphs may be generated in advance based on different possible selections being made at step 666, and in such a scenario the step 666 may be performed after the step 658 as shown in FIG. 23. For example, if multiple sets of improvement regions and graphs are pre-generated and made available to an inductor designer or fabricator, the selection at step 666 may be made at any time subsequent to the generation of the improvement regions and graphs. Once the selection at step 666 is made, the applicable one of the sets of improvement regions and graphs may be consulted. A catalog of different improvement regions and graphs may be consulted to facilitate a full range of design possibilities and aid in the understanding of how certain selections may affect the inductor component as a whole in various different aspects. Such an approach may identify designs that may be unsatisfactory without even having to specifically analyze them, build them or test them, and inductors and designers may instead focus on more promising designs as evidenced by the improvement regions and graphs. In other words, in some cases the improvement regions and graphs provided at step 658 may serve as a guide to which selection should be made at step 666 to provide an optimal inductor of the present invention.

At step 668, at least one other component parameter is selected in view of the selection made at step 666. In the example of the ($I_{SAT}$) value being selected at step 666, another parameter (besides the ($I_{SAT}$) value) may be selected to provide an improvement in the inductor being designed with respect to that parameter. The component being designed would therefore have the same parameter (($I_{SAT}$) in this example) as the reference component per the selection at step 666, but having an improved value with respect to the reference component regarding the parameter selected at step 668. The selection at step 668 may be made in reference to the regions provided in step 658 as illustrated in the examples above.

Following the example above, if the ($I_{SAT}$) value is selected at step 666 to match the reference inductor, the other parameter selected at step 668 may be one of the inductance value (L), the direct current resistance (DCR) value, and the core size. Any value of L, DCR and core size may be selected within the bounded regions of the graphs provided at step 658. Parameters or characteristics other than L, DCR and core size are possible for selection at step 668 and may likewise be selected in another example.

Once the selections at steps 664, 666 and 668 are made, the remaining parameters of the component design are now determined. For example, considering a scenario wherein the $I_{SAT}$ value is selected at step 666 and wherein the inductance value (L) is selected at step 668, the direct current resistance (DCR) value and the core size or volume value flow from the previous selections made and must be used to obtain the selected values at steps 666 and 668. The number of turns (N) and the effective permeability value (μ) also flow from the previous selections made and must be used to obtain the selected values at steps 666 and 668. In other words, once one parameter (e.g., the $I_{SAT}$ value) is selected to match the reference inductor, and one another parameter is selected to obtain an improvement relative to the reference inductor, the remaining parameters are now determined and are required to obtain the desired improvement. Accordingly, at step 670 the required parameters are accepted. The required parameters may be determined using the bounded regions as further demonstrated in the examples below.

At step 674, a core structure is fabricated having the volume and permeability as selected or required by the preceding steps. Where the permeability value is 1.0, the core structure can be fabricated from the same material as the core structure in the reference conductor. Where the permeability is not equal to 1, the core structure can be fabricated from same magnetic material as the core structure of the reference inductor with the physical gap being adjusted to achieve the desired permeability value, or may alternatively be selected from another magnetic material to achieve the selected or required permeability. In embodiments wherein the core volume is changed, the core volume may be proportionally changed (decreased) in all dimensions relative to the reference component selected at step 352 while otherwise retaining the same shape as the reference inductor. In certain embodiments, however, only the winding area (WA) in the core may be adjusted relative to the reference conductor while the footprint and the component height remain the same as discussed above and as shown in some of the examples below. As in the examples described above, the core structure may be formed in one piece or multiple pieces having the same or different shape. At step 676, the coil is fabricated from the composite material provided at step 654, having the conductivity determined at step 656, and having the effective diameter ratio determined at step 664. The coil is formed with a number of turns required at step 670 to complete a winding that, in combination with the other parameters selected or required, achieves the desired improvement. Any of the techniques and coil configurations described above may be utilized to construct the coil at step 676.

At step 678, the core and coil are assembled to complete the electromagnetic component exhibiting the parameter values selected at steps 666 and 668. In some embodiments, the steps of 674, 676 and 678 may occur at the same time. As one such example, in a laminated component construction including magnetic sheets, the magnetic sheets may be pressed around the coil to fabricate the magnetic core structure. As another example, in a laminated component construction including layers successively formed on a preexisting layer, the coil may simultaneously be formed with the magnetic core structure. The component completed may be configured as a power inductor or the component may be configured as a non-power inductor, a transformer, or still other type of electromagnetic component as desired.

While an exemplary method 650 has been described, the method and process steps may be performed using less than all of the steps shown, with additional steps included and/or the method and process steps may be performed in a different order. Various adaptations are possible within the scope of the pending claims.

FIGS. 24-35 more specifically illustrate various examples of electromagnetic component design and fabrication techniques utilizing the methodology described above.

Figure 24:
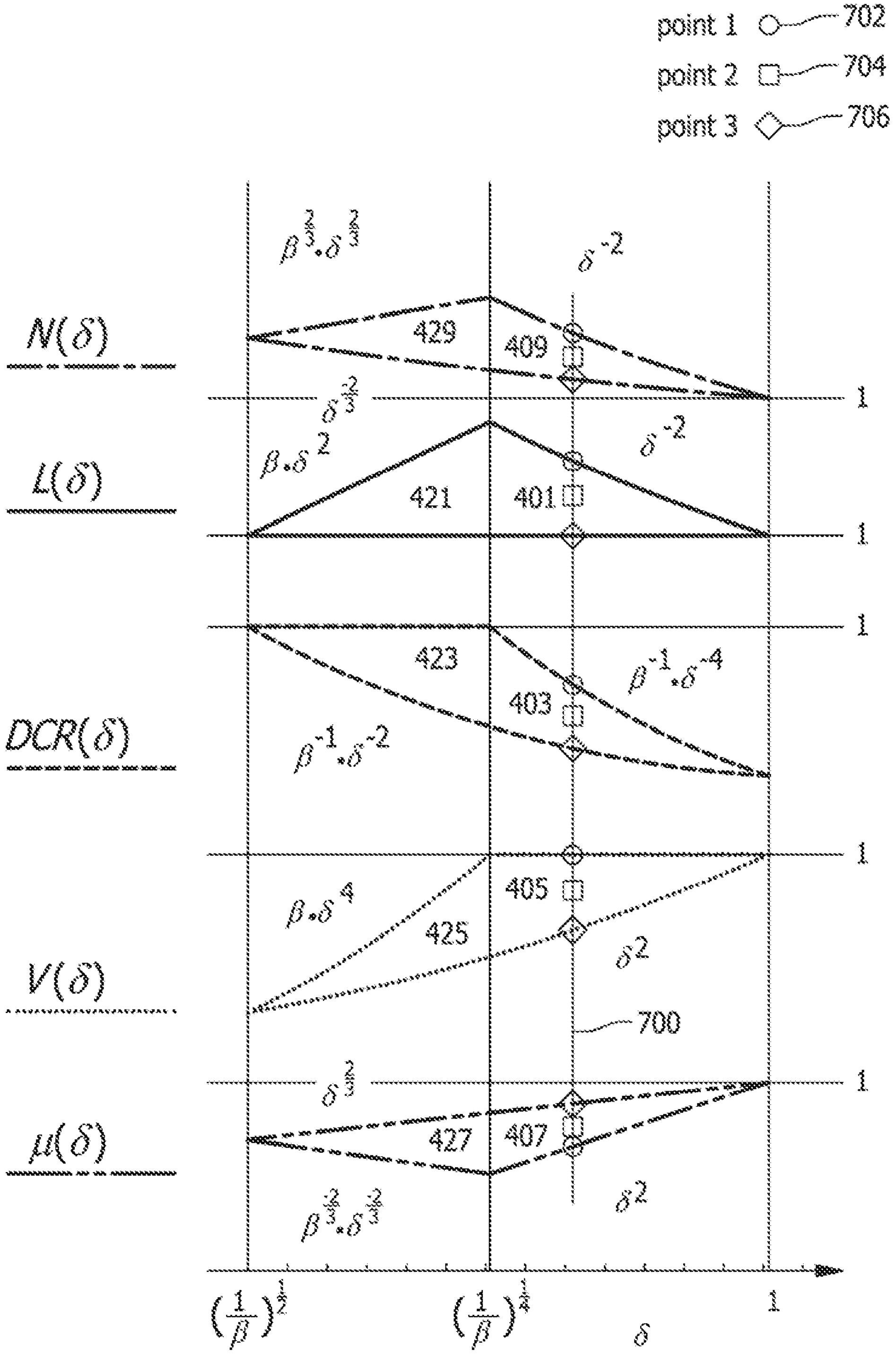
FIG. 24 is an exemplary design improvement region graph similar to FIG. 19 but showing different points of possible improvement for an inductor component formed in accordance with an exemplary embodiment of the present invention including an improved conductivity composite conductor material.

FIG. 24 is an exemplary design improvement region graph similar to FIG. 19 that may be utilized in the method of FIG. 23 to achieve different points of possible improvement for an electromagnetic inductor component of the present invention including improved conductivity composite material. FIG. 24 generally shows that for any given value of effective diameter ratio (δ), represented in FIG. 24 by the vertical line 700, different parameter values can be selected to achieve different performance characteristics or objectives in the inductor component design and fabrication of the invention.

More specifically, a first exemplary set of points 702, represented by circles in FIG. 24, may be utilized to construct a first embodiment of an inductor component according to the invention including improved conductivity composite material and a core size the same as the reference inductor, a maximum improved inductance value relative to the reference inductor, and improved direct current resistance relative to the reference inductor.

A second exemplary set of points 704, represented by squares in FIG. 24, is also shown. The second set of points 704 may be utilized to construct a second embodiment of an inductor component according to the invention including improved conductivity composite material and having a reduced core size relative the reference inductor, an increased inductance value relative to the reference inductor, and reduced direct current resistance relative to the reference inductor.

A third exemplary set of points 706 is shown in FIG. 24 and represented by diamonds. The third set of points 706 may be utilized to construct a third embodiment of an inductor component according to the invention including improved conductivity composite material and having a minimal core size relative to the reference inductor, the same inductance value as the reference inductor, and reduced direct current resistance relative to the reference inductor.

Other sets of points may be selected along the line 700 within the regions indicated to provide still other inductor embodiments of inductor components according to the invention including improved conductivity composite material but having other characteristics than the examples above defined by the points 702, 704 and 706. Considering other possible other possible values of effective diameter ratio (δ) values that may be selected to defines lines other than the line 700 shown in FIG. 24 from which corresponding points may be selected, including but not limited to a line that passes through the regions 421, 423 and 425 instead of the regions 401, 403 and 405 as shown in the example of FIG. 24.

Still further, a line (similar to the line 700) may be selected that coincides with the boundaries shown between the respective regions 421 and 401, the respective regions 423 and 403, and the respective regions 425 and 405. In such a case, it can be seen that the maximum inductance value L would be higher than the line 700 shown allows since the maximum inductance value peaks at this location. Viewing FIG. 24 from left to right, the inductance value L of a component according to the invention along any given line 700 increases from a value of 1 as the effective diameter ratio (δ) increases within the region 421 to its maximum value shown as the regions 421 meets the region 401, and then decreases in the region 401 from the maximum shown to a value of 1 that is again equal to the inductance value of the reference inductor.

It should now be appreciated that FIG. 24 graphically depicts a large number of possible inductor component design selections, represented here for discussion purposes as points along the line that fall within the bounded improvement regions, according to the invention. Inductor components including improved conductivity composite material constructed in accordance with selected points will exhibit the same or better characteristics of the reference inductor in the parameters illustrated. Once the regions 401, 403 and 405 are defined in a manner such as that shown in the example of FIG. 24 as a function of effective diameter ratio (δ), a range of inductor components according to the invention may be design and their characteristics may be readily be appreciated without intensive analysis, computation, or trial and error that traditional design processes would typically entail.

Figure 25:
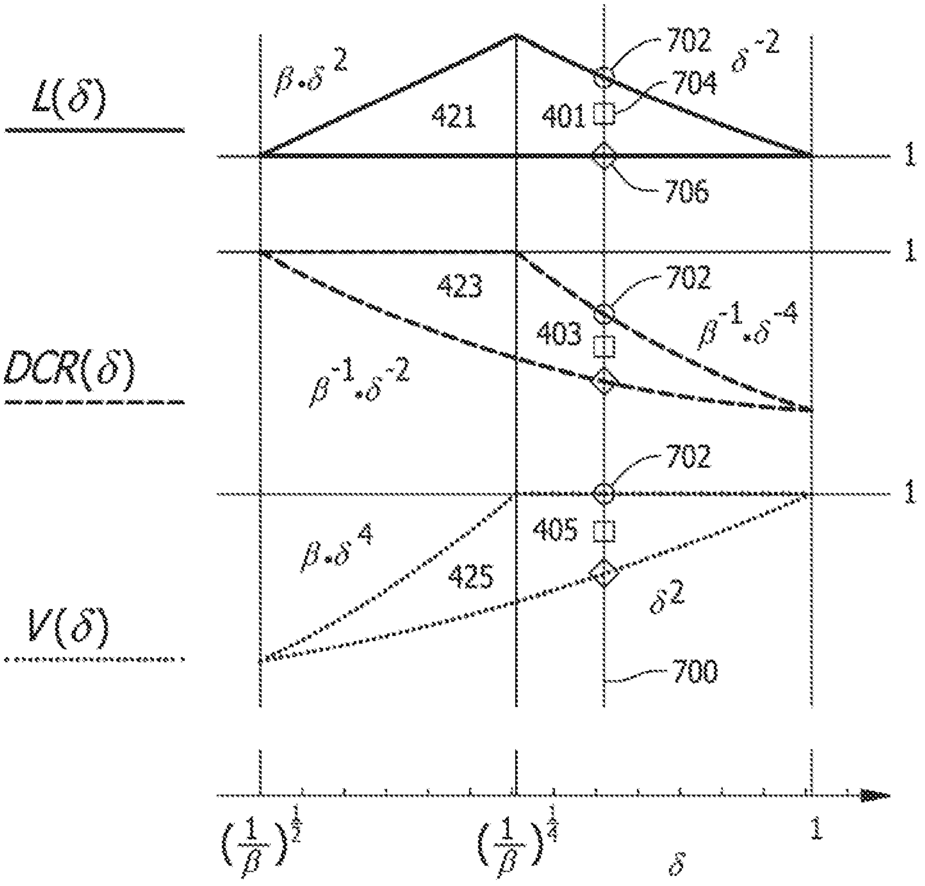
FIG. 25 is a magnified view of a portion of FIG. 24 illustrating selection of a first set of design characteristics of an inductor component formed in accordance with an exemplary embodiment of the present invention including an improved conductivity composite conductor material.

FIG. 25 is a magnified view of a portion of FIG. 24 showing the first set of points 702 selected for the (δ) value represented in by the exemplary vertical line 700 shown in the illustrated example. Assuming in the example of FIG. 25 that the inductor component design is desired to have the same saturation current value as the reference inductor, a maximum inductance value (i.e., the highest L value in the bounded region 401) for the selected (δ) value at step 662 (represented by the vertical line 700) may be selected for purposes of step 668. The highest L value for the selected (δ) value is seen at the top of FIG. 25. Because the saturation current value (step 666) and the inductance value (step 668) are now selected in this example, the DCR value and V value are now determined in the regions 403 and 405 and are required for use to construct an inductor according to the present invention including improved conductivity composite material. As such, the DCR value 702 in the region 403 and the V value 702 in the region 405 are each accepted per step 670 for the selected (δ) value at step 662 (represented by the vertical line 700).

Alternatively, as should be evident from FIG. 25, other points, including but not limited to the points 704 and 706 discussed above, may be selected along the line within the regions 401, 403, 405 in the example illustrated. Selection of such other points will produce an inductor component according to the invention including improved conductivity composite material but having an inductance value L that is less than the maximum point discussed above. Once again and following the example above, once the saturation current value (step 666) and an inductance value corresponding to either point 704 or 706 (step 668) are selected, the corresponding DCR values and V values for the selected point 704, 706 are now determined in the regions 403 and 405 and are required for use to construct an inductor according to the present invention including improved conductivity composite material.

Figure 26:
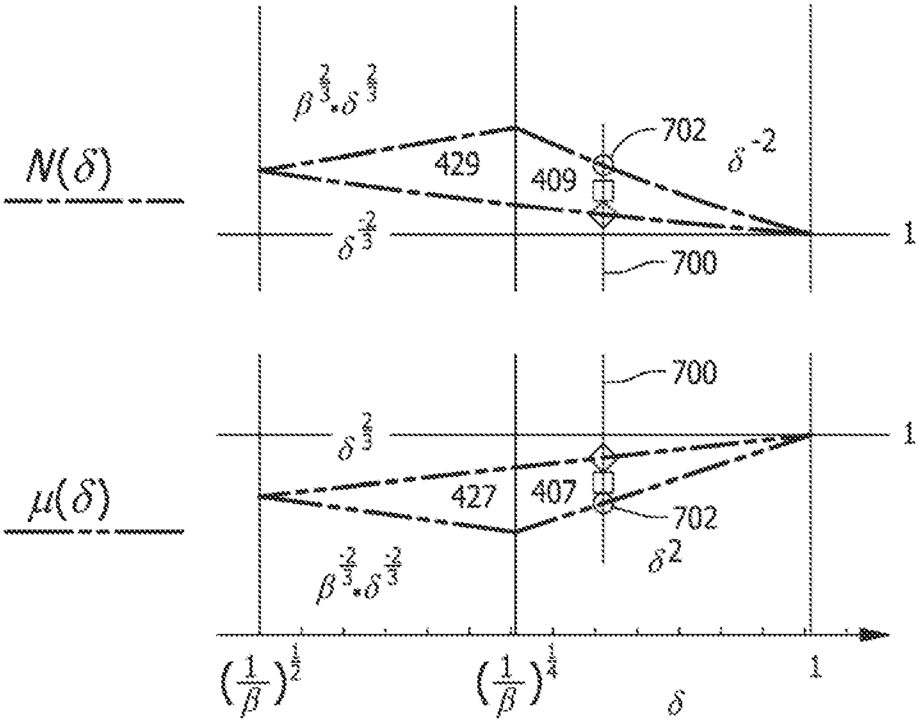
FIG. 26 is a magnified view of another portion of FIG. 24 and further illustrating another portion of the first set of design characteristics.

As shown in FIG. 26, the number of turns value 702 in the region 409 and the effective permeability value 702 in the region 407 are also now determined and required for use by virtue of the prior selection of the saturation current value (step 666) and the inductance value (step 668). The number of turns value and the effective permeability value are each accepted per step 670 for the selected (δ) value at step 662 (represented by the vertical line 700).

Figure 27:
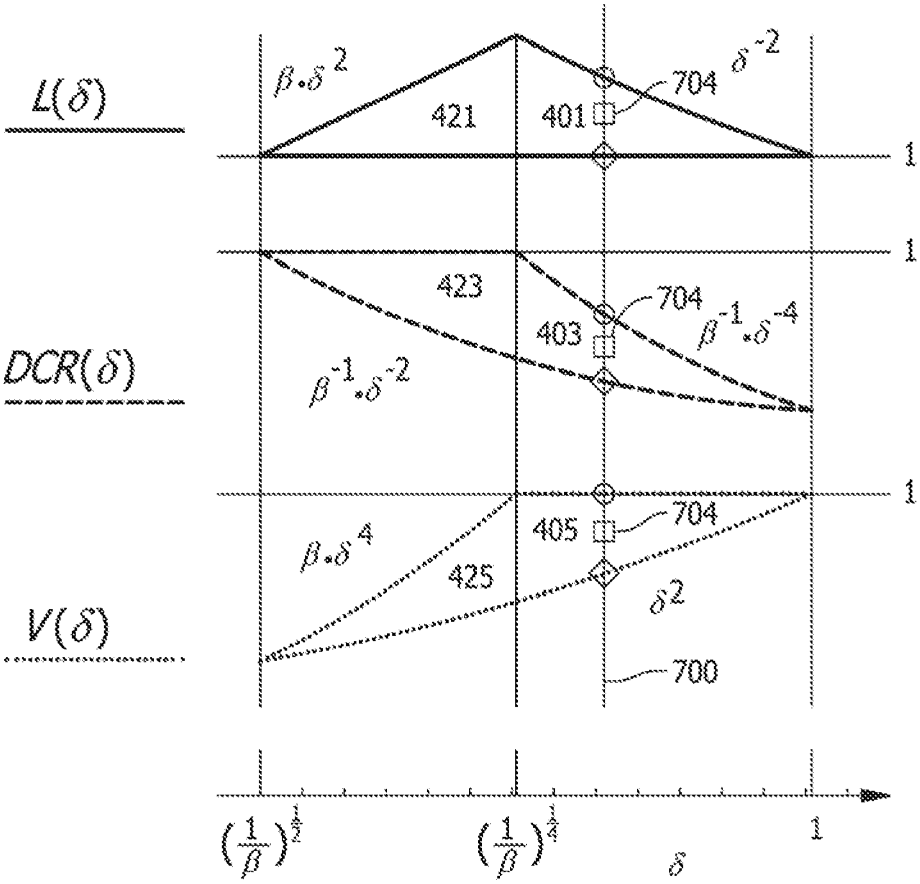
FIG. 27 is another view similar to FIG. 25 but illustrating a second set of design characteristics of an electromagnetic component formed in accordance with an exemplary embodiment of the present invention including an improved conductivity composite conductor material.

Once the appropriate selections are made, as represented by the lines and points discussed above in relation to FIGS. 24 and 25, the inductor component according to the invention can then be constructed per steps 674, 676 and 678 to achieve parameters corresponding, for example only, to the points 702 shown in FIGS. 25, 26 and 27. The inventive inductor components constructed using the points 702 will have the same core size (and shape) as the reference inductor, a maximum improved inductance value relative to the reference inductor for the selected (δ) value, and improved direct current resistance relative to the reference inductor.

FIG. 27 is a magnified view of a portion of FIG. 24 showing the second set of points 702 selected for the (δ) value represented by the vertical line 700. Assuming in the example of FIG. 27 that the component design is desired to have the same saturation current value as the reference inductor, an improved (but not maximum) L value 704 in the bounded region 401 for the selected (δ) value at step 662 (represented by the vertical line 700) may be selected for purposes of step 668. Because the saturation current value (step 666) and the inductance value 704 (step 668) are now selected in this example, the DCR value and V value are now determined and required for use. As such, the DCR value 704 in the region 403 and the V value 704 in the region 405 are each accepted per step 670 for the selected (δ) value at step 662 (represented by the vertical line 700).

Figure 28:
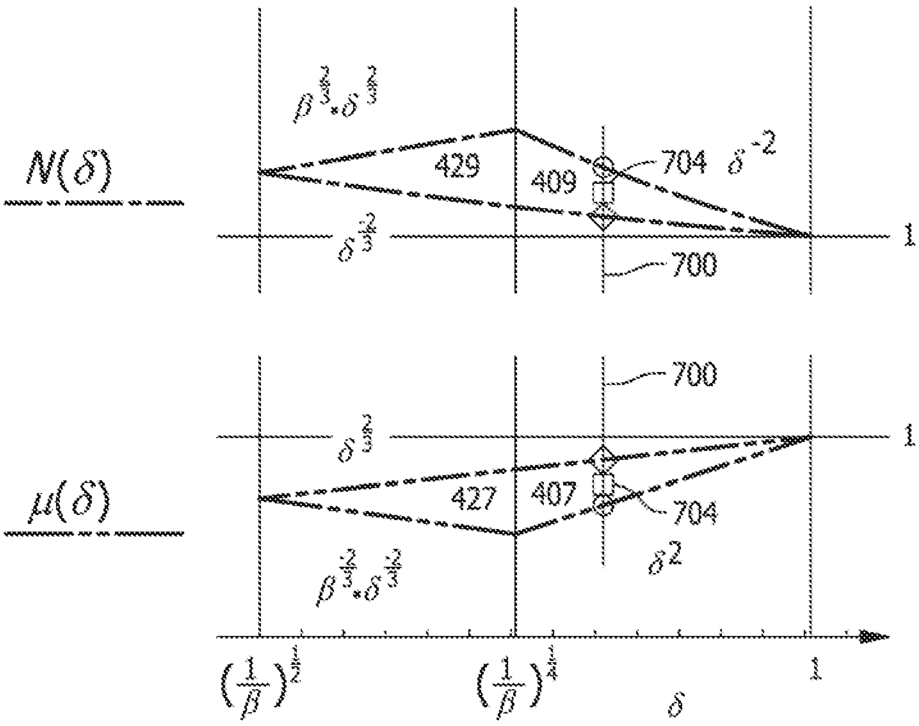
FIG. 28 is a magnified view similar to FIG. 26 and further illustrating the second set of design characteristics.

As shown in FIG. 28, the number of turns value 704 in the region 409 and the effective permeability value 704 in the region 407 are also now determined and required for use by virtue of the prior selection of the saturation current value (step 666) and the inductance value (step 668). The number of turns value and the effective permeability value are each accepted per step 670 for the selected (δ) value at step 662 (represented by the vertical line 700).

Figure 29:
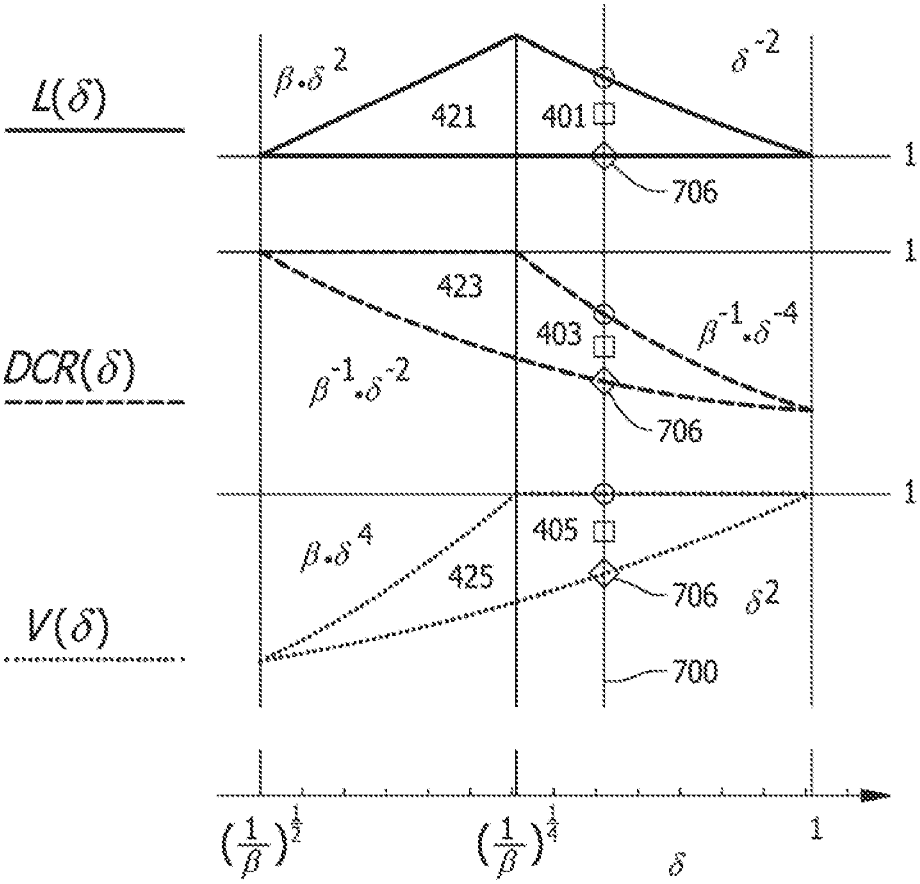
FIG. 29 is another view similar to FIG. 25 but illustrating a third set of design characteristics of an electromagnetic component formed in accordance with an exemplary embodiment of the present invention and including an improved conductivity composite conductor material.

An inductor component according to the invention including improved conductivity composite material can then be constructed per steps 674, 676 and 678 to achieve the characteristics corresponding to the points 704 shown in FIGS. 27 and 28. The inventive inductor component constructed will have improved inductance, direct current resistance and core size relative to the reference inductor. The core size in the completed inductor of the invention is proportionally reduced in all dimensions as explained above, without changing the overall shape of the core relative to the reference inductor, FIG. 29 is a magnified view of a portion of FIG. 24 showing the third set of points 706 selected for the (δ) value represented by the vertical line 700. Assuming in the example of FIG. 29 that the inductor component design according to the invention including improved conductivity composite material is desired to have the same saturation current value as the reference inductor, the minimum DCR value 706 in the bounded region 403 for the selected (δ) value at step 662 (represented by the vertical line 700) may be selected for purposes of step 668. Because the saturation current value (step 666) and the DCR value 706 (step 668) are now selected in this example, the inductance value L and V value are now determined and required for use to construct an inductor according to the invention including improved conductivity composite material. As such, the L value 706 in the region 401 and the V value 706 in the region 405 are each accepted per step 670 for the selected (δ) value at step 662 (represented by the vertical line 700).

Figure 30:
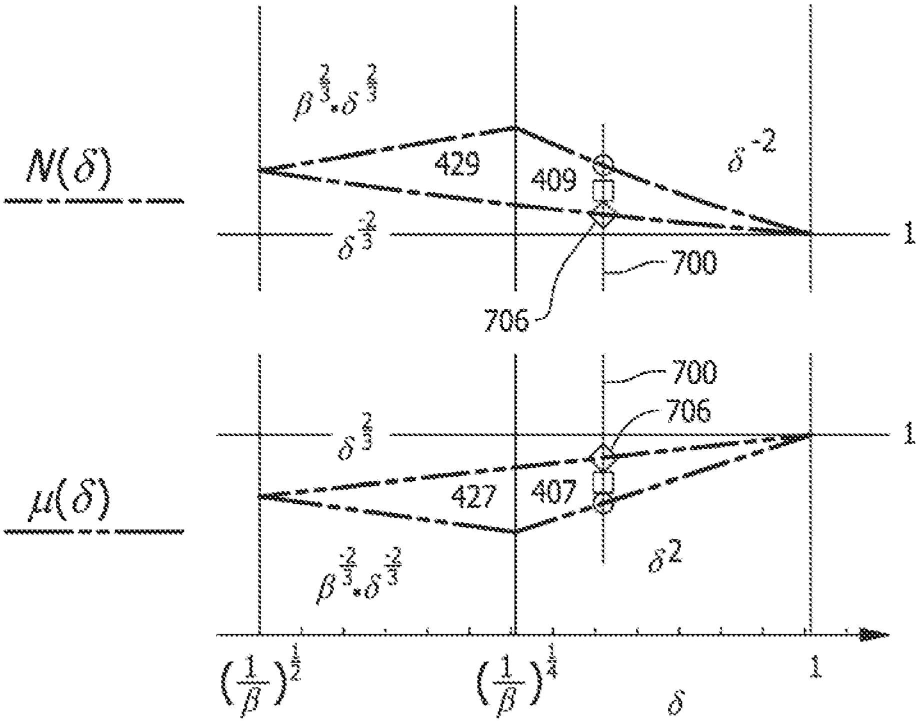
FIG. 30 is a magnified view similar to FIG. 26 and further illustrating the second set of design characteristics.

As shown in FIG. 30, the number of turns value 706 in the region 409 and the effective permeability value 706 in the region 407 are also now determined and required for use by virtue of the prior selection of the saturation current value (step 666) and the DCR value (step 668). The number of turns value and the effective permeability value are each accepted per step 670 for the selected (δ) value at step 662 (represented by the vertical line 700).

The inductor component of the invention including improved conductivity composite material can then be constructed per steps 674, 676 and 678 to achieve characteristics corresponding to the points 706 shown in FIGS. 29 and 30. The inventive inductor component constructed will have the minimum direct current resistance, the same inductance value as the reference inductor, and a minimum core size relative to the reference inductor. The core size in the completed inductor of the invention is proportionally reduced, without changing the shape of the core relative to the reference inductor, FIGS. 31-35 illustrates still aspects of an inductor component design according to the invention including improved conductivity composite material. In these figures, only one of the dimensions of the core of the inventive inductor component, namely the height dimension, is reduced while the remaining dimensions (length and width) remain the same. As such, the inventive inductor component may have the same footprint area as the reference inductor, but with a reduced component height. Lower profile inductors according to invention are therefore realized with improved performance relative to reference inductors, but having the same footprint for circuit board applications.

The methodology illustrated in the relation to the exemplary graphs of FIGS. 31-35 may be particularly beneficial for improving so-called families of components that may be used as reference inductors. For discussion purposes, a "family" as used herein shall refer to a set of inductor components having a common design structure (e.g., the same magnetic core structure fabricated from the same magnetic material(s) and having the same coil configuration fabricated from the same conductive material). Additionally, each of the set of components in a "family" typically has the same "footprint" as defined above in paragraph [0004] but has one of a plurality of different ratings, such that the family can collectively meet the needs of various different applications while still providing economies of scale in the inductor manufacture. The methodology herein may be particularly useful in providing such families with equal footprint, but lower "profile" (i.e., a reduced height dimension) of inductor components to facilitate the trend of smaller electronic devices in the corresponding dimension and meet needs that are difficult, if not impossible, to fulfill using convention inductor design and fabrication techniques utilizing conventional copper materials having a lower conductivity than the composite materials described herein.

Figure 31:
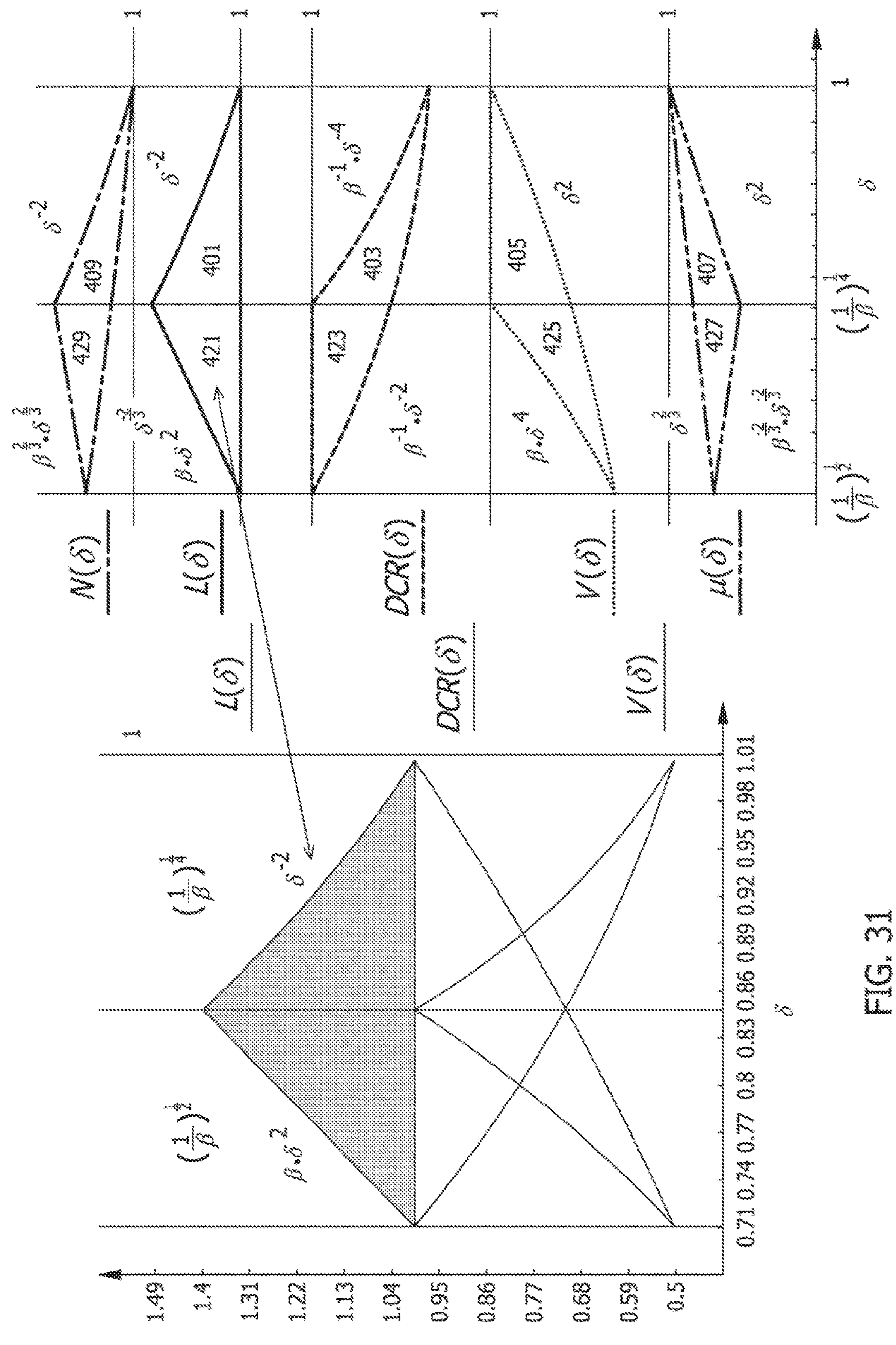
FIG. 31 is another graphical illustration highlighting a first one of multiple design improvement regions for an inductor component formed in accordance with an exemplary embodiment of the present invention and including an improved conductivity composite conductor material.

FIG. 31 illustrates a first improvement region in graphical form for an inductor component or family of components according to the present invention including improved conductivity composite material. Specifically, FIG. 31 indicates the bounded inductance value L regions 401 and 421 as described above. A range of (δ) values are plotted along the x-axis with a range of inductor values plotted along the y-axis.

Figure 32:
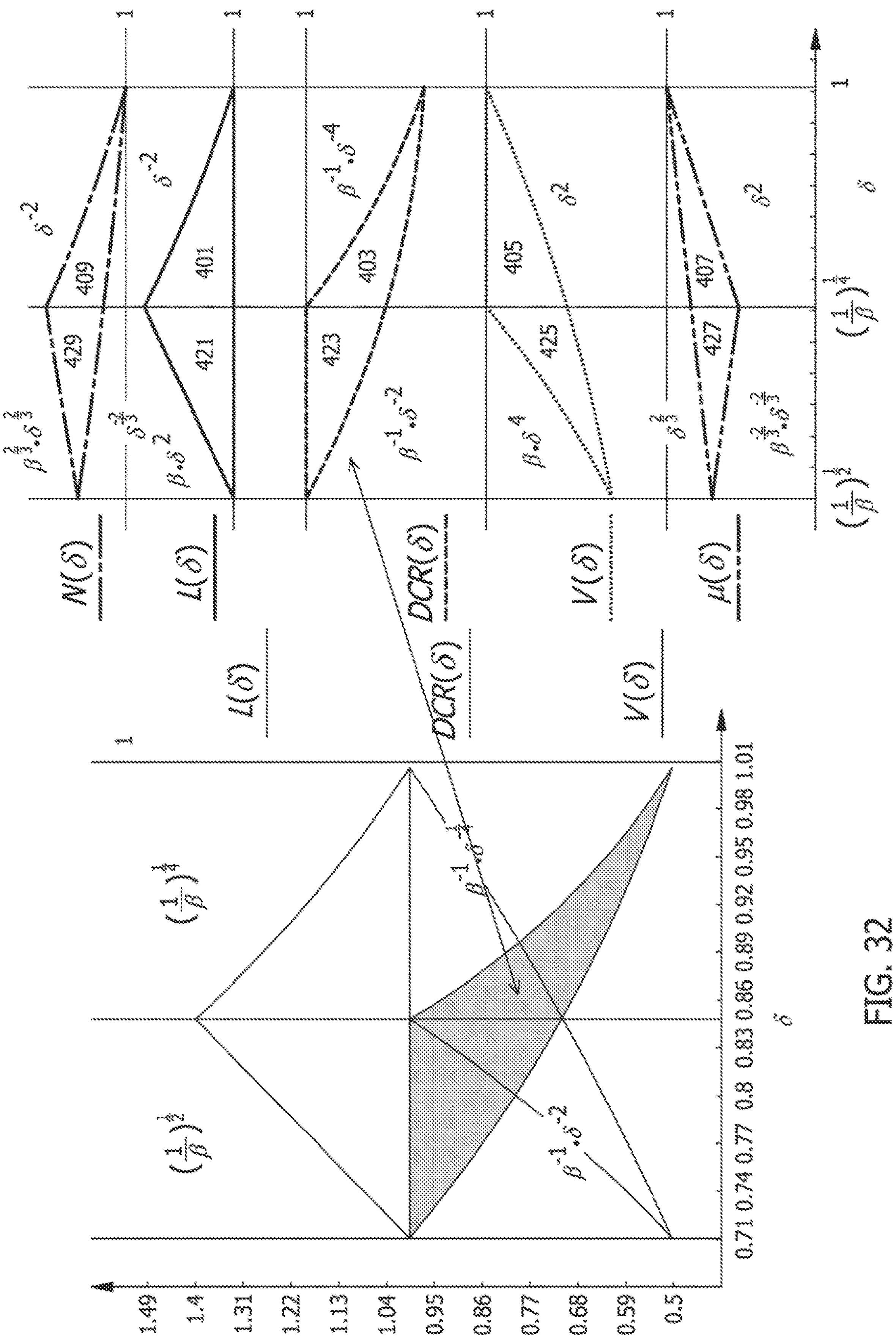
FIG. 32 is a view similar to FIG. 31 but highlighting a second one of multiple design improvement regions for the inductor component of the invention.

FIG. 32 illustrates a second improvement region in graphical form for an inductor component or family of components according to the present invention including improved conductivity composite material. Specifically, FIG. 32 indicates the bounded DCR value regions 403 and 423 as described above. A range of (δ) values are plotted along the x-axis with a range of DCR values plotted along the y-axis.

Figure 33:
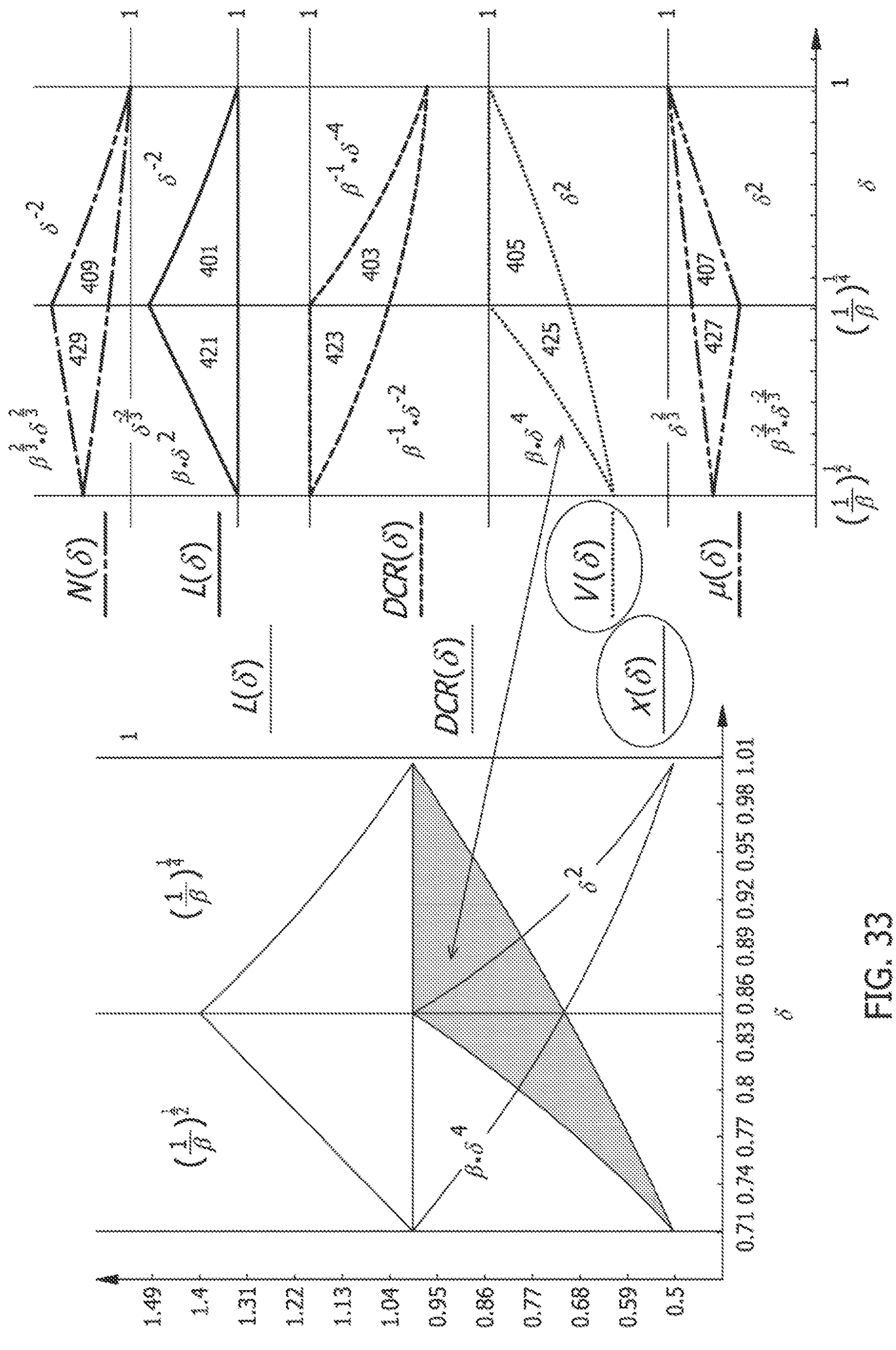
FIG. 33 is a view similar to FIG. 31 but illustrating a third one of multiple design improvement regions for the inductor component of the invention.

FIG. 33 illustrates a third improvement region in graphical form for an inductor component or family of components according to the present invention including improved conductivity composite material. Specifically, FIG. 33 indicates the bounded core size V value regions 405 and 425 as described above. A range of (δ) values are plotted along the x-axis with a range of V values plotted along the y-axis. Because in the example of FIG. 33 the core area or footprint of the inventive inductor component is constant (i.e., the same as the reference component), only the height dimension of the an inductor component according to the present invention including improved conductivity composite material can actually be varied relative to the reference component and is reflected in the values of the y-axis.

FIG. 34 illustrates a fourth improvement region in graphical form for an inductor component or family of components according to the present invention including improved conductivity composite material. Specifically, FIG. 34 indicates the required number of turns value (N) regions. A range of (δ) values are plotted along the x-axis with a range of inductor values plotted along the y-axis. For the reasons explained earlier, the required number of turns values N in FIG. 34 does not correspond to the regions 409, 429 as shown and described in relation to FIG. 19. As such, for any given value of (δ), the upper and lower limits of the bounded region shown in FIG. 34 is different than the regions 409 and 429 that apply to cases wherein the core size is proportionally varied in all dimensions without otherwise changing the shape.

FIG. 35 illustrates a fifth improvement region in graphical form for an inductor component or family of components according to the present invention including improved conductivity composite material. Specifically, FIG. 35 indicates the required effective permeability regions. A range of (δ) values are plotted along the x-axis with a range of permeability values plotted along the y-axis. For the reasons explained earlier, the required permeability values in FIG. 35 do not correspond to the regions 407, 427 as shown and described in relation to FIG. 19. As such, for any given value of (δ) the upper and lower limits of the bounded region shown in FIG. 35 is different than the regions 407 and 427 that apply to cases wherein the core size is proportionally varied in all dimensions without otherwise changing the shape.

Except as described above, the selection of parameters to construct an inductor component according to the present invention including improved conductivity composite material in accord with FIGS. 31-35 utilizes the methodology of FIG. 23 with similar benefits. Once the parameters are selected or accepted as required, the components can be fabricated by linearly reducing the core size in the height dimension, but otherwise retaining its size and shape in the length and width dimensions. Because the core area of the inductor of the invention is the same as the reference inductor in the length and width dimension, the mean turns per length in the inventive inductor constructed is the same as the reference conductor. Improvements such as those described above may otherwise be realized using, for example, the graphs of FIGS. 31-35 instead of the preceding graphs. Electromagnetic inductor components formed according to the present invention may therefore be readily obtained in view of the teachings of the present disclosure, without necessarily undertaking the laborious task of theoretical component design, and without necessarily incurring expensive and time consuming experimentation of new component constructions. Improved inductors having better performance may be provided at relatively low cost while continuing to reduce the physical package size of inductors and/or improving component performance in different aspects or a combination of aspects. In view of the inventive design approach described above, a vast number of copper-based inductor components can be readily translated to new and improved inductor devices using ultra-conductive composite materials. Inductor designs can rather easily be optimized with respect to one or more of a plurality of parameters. The benefits of such components according to the invention are perhaps most significant for miniaturized power inductor components used in circuit boards of increasingly smaller and powerful electronic devices, but the benefits also accrue to other types of inductors as well.

The benefits and advantages of the inventive concepts are now believed to have been amply illustrated in relation to the exemplary embodiments disclosed.

An embodiment of an electromagnetic inductor component has been disclosed including: a magnetic core; and a conductor fabricated from a conductive material having a first electrical conductivity, the conductor shaped to form a coil defining a winding completing a number of turns; and the conductor further shaped with a first cross sectional area and corresponding effective diameter that is determined by a ratio of electrical conductivity (β) of the first electrical conductivity of the conductor relative to a second electrical conductivity of a reference conductor in a reference electromagnetic inductor component; wherein the first electrical conductivity is greater than the second electrical conductivity.

Optionally, the ratio of electrical conductivity (β) may be within the range of about 1.1 to about 10. The conductive material having the first electrical conductivity may include a composite conductive material including carbon nanotubes. The conductive material may include 0.1% to 100%, by weight, of carbon nanotubes. The reference conductor material may be one of copper and a copper alloy. The cross sectional area may not be round.

Also optionally, the conductive material having a first electrical conductivity may be an ultra-conductive material. The reference conductor may be fabricated from one of copper, copper alloy, aluminum, aluminum alloy, silver, or silver alloy. The component may be configured as a power inductor. Alternatively, the component is configured as a non-power inductor.

Optionally, the ratio of electrical conductivity (β) may define an upper limit and a lower limit for the effective diameter of the conductor, and the effective diameter may be selected to be within a range defined by and including the upper and lower limits. The inductor component may be configured to operate with a plurality of performance parameters including an inductance value, an effective permeability, a saturation current value, a core size, a number of turns, and a direct current resistance value when connected to electrical circuitry; wherein one of the plurality of performance parameters may match a corresponding performance parameter of the reference inductor component, and wherein a performance value of at least one other of the plurality of performance parameters may be selected to be within one of a plurality of respective bounded regions defined as a function of at least one of the electrical conductivity ratio (β) and an effective diameter ratio (δ) of the conductor relative to the reference conductor material. A plurality of the performance parameters may each be respectively selected to be within the respective one of the plurality of bounded regions.

Optionally, the saturation current value matches a saturation current value for the reference inductor component. The effective diameter ratio (δ) may be within a range of about 1 to about $\beta^{(-1/2)}$.

As further options, the effective diameter ratio (δ) may be within a range of about 1 to about $\beta^{-1/4}$. The inductance value may be selected from or determined by a bounded region defined by and between an upper boundary value defined by a function (δ–2) and a lower boundary value of 1.0. The direct current resistance (DCR) value is selected from or determined by a bounded region defined by and between an upper boundary valued defined by the function $[\beta^{(-1)}*\delta^{(-4)}]$ and a lower boundary value defined by a function $[\beta^{(1)}*\delta^{(2)}]$. A core volume of the magnetic core may be selected from or determined by a bounded region defined by and between an upper boundary value of 1 and a lower boundary value defined by a function ($\delta^2$). The effective permeability of the magnetic core may be selected from or determined by a bounded region defined by and between an upper boundary defined by a function ($\delta^{2/3}$) and a lower boundary value defined by a function ($\delta^2$). A number of turns in the winding may be selected from or determined by a bounded region defined by and between an upper boundary defined by a function ($\delta^{-2}$) and a lower boundary value defined by a function ($\delta^{(-2/3)}$)). The reference electromagnetic inductor component may further have a reference core and a reference core size; wherein a core size in the magnetic core is proportionally reduced relative to the reference core size; and wherein the core size in the magnetic core is selected from or determined by a bounded region defined by and between an upper boundary value of 1 and a lower boundary value defined by a function $\delta^2$. Alternatively, the reference electromagnetic inductor component may further have a reference core and a reference core size including a reference Window Area; wherein the height of the Window Area in the magnetic core is linearly reduced relative to the reference Window Area; and wherein the height of the Window Area in the magnetic core is selected from or determined by a bounded region defined by and between an upper boundary value defined by a function ($\delta^{-2}$) and lower boundary value of 1. Still further, the reference electromagnetic inductor component further has a reference core and a reference core size; a core size in the magnetic core may be proportionally reduced relative to the reference core size; and an effective permeability of the magnetic core may be selected from or determined by a bounded region defined by and between an upper boundary value defined by a function ($\delta^{2/3}$) and a lower boundary value defined by a function ($\delta^{(2)}$).

Also, the reference electromagnetic inductor component may further have a reference core and a reference core size including a reference Window Area; wherein the height of the Window Area in the magnetic core is linearly reduced relative to the reference Window Area; and wherein an effective permeability of the magnetic core may be selected from or determined by a bounded region defined by and between an upper boundary value of 1 and a lower boundary value defined by a function ($\delta^{(-2)}$).

As still further options, an effective diameter ratio (δ) of the conductor relative to the reference conductor material may be within a range of about $\beta^{-1/4}$ to about $\beta^{-1/2}$. An inductance value of the component may be selected from or determined by a bounded region defined by and between an upper boundary value defined by a function [$\beta*\delta^2$] and a lower boundary value of 1. A direct current resistance (DCR) value of the component may be selected from or determined by a bounded region defined by and between an upper boundary value of 1 and a lower boundary value defined by a function [$\beta^{(-1)}*\delta^{(-2)}$]. The reference electromagnetic inductor component may further have a reference core and a reference core size; wherein a core size in the magnetic core is proportionally reduced relative to the reference core size; and wherein a core size of the magnetic core is selected from or determined by a bounded region defined by and between an upper boundary value defined by a function [($\beta*\delta^{(4)}$] and a lower boundary value defined by a function ($\delta^2$). Alternatively, the reference electromagnetic inductor component may further have a reference core and a reference core size including a reference Window Area; wherein the height of the Window Area in the magnetic core is linearly reduced relative to the reference Window Area; and wherein the height of the Window Area in the magnetic core is selected from or determined by a bounded region defined by and between an upper boundary value defined by a function ($\beta*\delta^2$) and lower boundary value of 1. Further, the reference electromagnetic inductor component further has a reference core and a reference core size; wherein a core size in the magnetic core is proportionally reduced relative to the reference core size; and wherein an effective permeability of the magnetic core is selected from or determined by a bounded region defined by and between an upper boundary value defined by a function $\delta^{2/3}$ and a lower boundary value defined by a function [$\beta^{(-2/3)}*\delta^{(-2/3)}$]. Also, the reference electromagnetic inductor component further has a reference core and a reference core size including a reference Window Area; wherein the height of the Window Area in the magnetic core is linearly reduced relative to the reference Window Area; and wherein an effective permeability of the magnetic core is selected from or determined by a bounded region defined by and between an upper boundary value defined by a value of 1 and a lower boundary value defined by a function ($\beta^{-1}*\delta^{-2}$). The reference electromagnetic inductor component may optionally further have a reference core and a reference core size; wherein a core size in the magnetic core is proportionally reduced relative to the reference core size; and wherein the number of turns may be selected from or determined by a bounded region defined by and between an upper boundary value defined by a function [$\beta^{(2/3)}*\delta^{(2/3)}$] and a lower boundary defined by a function ($\delta^{(-2/3)}$). Alternatively, the reference electromagnetic inductor component may have a reference core and a reference core size including a reference Window Area; wherein the height of the Window Area in the magnetic core is linearly reduced relative to the reference Window Area; and wherein the number of turns of the winding is selected from or determined by a bounded region defined by and between an upper boundary value defined by a function [$\beta*\delta^2$] and a lower boundary value of 1.

The magnetic core may optionally define a core volume containing the winding; wherein the core volume includes a Window Area (WA), a Mean Length Per Turn (MLT), and a Cross sectional Area (AC); and wherein one of the core volume and the selected number of turns is selected in view of one of the ratio of electrical conductivity (β) and the effective diameter ratio (δ) of the conductor relative to the reference conductor material.

A method of manufacturing an electromagnetic inductor component has also been disclosed including: selecting a reference inductor component including a reference magnetic core and a reference conductor material and having a plurality of reference performance parameters selected from the group of at least an inductance value, an effective permeability, a saturation current value, and a direct current resistance value when connected to electrical circuitry; providing a composite conductive material having a conductivity greater than a conductivity of the reference conductor material; determining a ratio of electrical conductivity (β) of the composite conductor relative to the electrical conductivity of the reference conductor material; based on the determined ratio of electrical conductivity (β), determining an upper limit and lower limit of an effective diameter of the composite conductive material; and selecting an effective diameter within the determined upper and lower limit.

Optionally, the method may also include fabricating a coil from the provided composite conductive material having the selected effective diameter and otherwise configured similarly to a reference coil in the reference inductor component. The electromagnetic inductor component may be configured to operate with performance parameters corresponding to the reference performance parameters when connected to electrical circuitry; and the method may further include: determining an effective diameter ratio (δ) of the composite conductor relative to the reference conductor material; and selecting a value of at least one of the performance parameters from within a respective region of values defined by a function of at least one of the ratio of electrical conductivity (β) and the effective diameter ratio (δ). The method may also include selecting a core volume value and a number of turns of the coil to be within a respective bounded region of values defined by at least one function of the ratio of electrical conductivity (β) and the effective diameter ratio (δ).

The method may also optionally include: fabricating a magnetic core having the selected core volume; and assembling a coil with the fabricated magnetic core, the coil being fabricated from the provided composite conductive material having the effective diameter, and the coil having a winding including the selected number of turns. Fabricating the magnetic core may include fabricating a magnetic core having a shape and volume that is proportionally decreased relative to the reference core of the reference inductor. Fabricating the magnetic core may also include fabricating a magnetic core having a window area height that is proportionally changed relative to the reference inductor.

Optionally, selecting values of at least one of the performance parameters may include selecting one of the performance parameters to match a corresponding one of the reference performance parameters, and selecting at least one other of the remaining performance parameters from one of the respective bounded regions of values, wherein each bounded region of values is defined by at an upper boundary or a lower boundary that is a function of at least one of the ratio of electrical conductivity (β) and the effective diameter ratio (δ). The method may further include fabricating an electromagnetic inductor component having a selected effective diameter and the selected conductivity value to achieve at least one of the selected performance parameters.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of manufacturing an electromagnetic inductor component comprising:

selecting a reference inductor component including a reference magnetic core and a reference conductor material and having a plurality of reference performance parameters selected from the group of at least an inductance value, an effective permeability, a saturation current value, and a direct current resistance value when connected to an electrical circuitry;

providing a composite conductive material having a first conductivity greater than a second conductivity of the reference conductor material;

determining a ratio of electrical conductivity (β) of the composite conductive material relative to the second conductivity of the reference conductor material;

based on the determined ratio of electrical conductivity (β), determining an upper limit and lower limit of an effective diameter of the composite conductive material; and selecting a diameter within the determined upper and lower limit.

2. The method of claim 1, further comprising fabricating a coil from the composite conductive material having the selected diameter and configured based on a reference coil in the reference inductor component.

3. The method of claim 1, wherein the electromagnetic inductor component is configured to operate with performance parameters corresponding to the reference performance parameters when connected to the electrical circuitry;

wherein the method further comprises:

determining a diameter ratio (δ) of the composite conductive material relative to the reference conductor material; and selecting a value of at least one of the performance parameters corresponding to the reference performance parameters from within a respective region of values defined by a function of at least one of the ratio of electrical conductivity (β) and the diameter ratio (δ).

4. The method of claim 3, further comprising selecting a core volume value and a number of turns of a coil to be within a respective bounded region of values defined by at least one function of the ratio of electrical conductivity (β) and the diameter ratio (δ).

5. The method of claim 4, further comprising:

fabricating a magnetic core having the selected core volume value; and assembling the coil with the fabricated magnetic core, the coil being fabricated from the composite conductive material having the effective diameter, and the coil having a winding including the number of turns.

6. The method of claim 5, wherein fabricating the magnetic core comprises fabricating the magnetic core having a shape and volume that is proportionally decreased relative to the reference magnetic core of the reference inductor component.

7. The method of claim 5, wherein fabricating the magnetic core comprises fabricating the magnetic core having a window area height that is proportionally changed relative to the reference inductor component.

8. The method of claim 3, wherein selecting values of at least one of the performance parameters comprises selecting one of the performance parameters to match a corresponding one of the reference performance parameters, and selecting at least one other of remaining performance parameters from one of respective bounded regions of values, wherein each bounded region of values is defined by at an upper boundary or a lower boundary that is a function of at least one of the ratio of electrical conductivity (β) and the diameter ratio (δ).

9. The method of claim 8, further comprising fabricating an electromagnetic inductor component having the selected diameter and the first conductivity to achieve the selected one of the performance parameters.

10. The method of claim 1, wherein the ratio of electrical conductivity (β) is within a range of about 1.1 to about 10.

11. The method of claim 1, wherein the composite conductive material having the first conductivity comprises a composite conductive material including carbon nanotubes.

12. The method of claim 11, wherein the composite conductive material includes 0.1% to 100%, by weight, of carbon nanotubes.

13. The method of claim 12, wherein the reference conductor material is one of copper and a copper alloy.

14. The method of claim 1, wherein the composite conductive material having the first conductivity comprises an ultra-conductive material.

15. The method of claim 14:

wherein the reference conductive material is fabricated from one of copper, copper alloy, aluminum, aluminum alloy, silver, or silver alloy.

16. The method of claim 1, wherein the electromagnetic inductor component is configured as a power inductor.

17. The method of claim 1, wherein the electromagnetic inductor component is configured as a non-power inductor.

18. The method of claim 1, wherein the electromagnetic inductor component comprises a cross sectional area that is not round.

19. The method of claim 1:

wherein the ratio of electrical conductivity (β) defines the upper limit and the lower limit for the effective diameter of the composite conductive material conductor; and wherein the effective diameter is selected to be within a range defined by and including the upper and lower limits.

20. The method of claim 19:

wherein the electromagnetic inductor component is configured to operate with the plurality of performance parameters comprising the inductance value, the effective permeability, the saturation current value, a core size, a number of turns, and a direct current resistance value when connected to the electrical circuitry; and wherein one of the plurality of performance parameters matches a corresponding performance parameter of the reference inductor component, and wherein a performance value of at least one other of the plurality of performance parameters is selected to be within one of a plurality of respective bounded regions defined as a function of at least one of the electrical conductivity ratio ($\beta$) and an effective diameter ratio ($\delta$) of the composite conductive material relative to the reference conductor material.

21. The method of claim 20, wherein the plurality of the performance parameters is each respectively selected to be within a respective one of the plurality of respective bounded regions.

22. The method of claim 20, wherein the saturation current value matches a saturation current value for the reference inductor component.

23. The method of claim 22, wherein the effective diameter ratio ($\delta$) is within a range of about 1 to about $\beta^{(-1/2)}$.

24. The method of claim 23, wherein the effective diameter ratio ($\delta$) is within a range of about 1 to about $\beta^{-1/4}$.

25. The method of claim 24, wherein the inductance value is selected from or determined by a bounded region defined by and between an upper boundary value defined by a function ($\delta^{-2}$) and a lower boundary value of 1.0.

26. The method of claim 24, wherein a direct current resistance (DCR) value is selected from or determined by a bounded region defined by and between an upper boundary valued defined by a function [$\beta^{(-1)}*\delta^{(-4)}$] and a lower boundary value defined by a function [$\beta^{(-1)}*\delta^{(-2)}$].

27. The method of claim 24, further comprising:

fabricating a magnetic core, wherein a core volume of the magnetic core is selected from or determined by a bounded region defined by and between an upper boundary value of 1 and a lower boundary value defined by a function ($\delta^2$).

28. The method of claim 27, wherein an effective permeability of the magnetic core is selected from or determined by a bounded region defined by and between an upper boundary defined by a function ($\delta^{2/3}$) and a lower boundary value defined by a function ($\delta^2$).

29. The method of claim 27, further comprising assembling a coil with the fabricated magnetic core, the coil having a winding, wherein a number of turns in the winding is selected from or determined by a bounded region defined by and between an upper boundary defined by a function ($\delta^{-2}$) and a lower boundary value defined by a function ($\delta^{(-2/3)}$).

30. The method of claim 27:

wherein the reference inductor component further has a reference core and a reference core size;

wherein a core size in the magnetic core is proportionally reduced relative to the reference core size; and wherein the core size in the magnetic core is selected from or determined by a bounded region defined by and between an upper boundary value of 1 and a lower boundary value defined by a function $\delta^2$.

31. The method of claim 27:

wherein the reference inductor component further has a reference core and a reference core size including a reference Window Area;

wherein a height of a Window Area in the magnetic core is linearly reduced relative to the reference Window Area; and wherein the height of the Window Area in the magnetic core is selected from or determined by a bounded region defined by and between an upper boundary value defined by a function ($\delta^{-2}$) and lower boundary value of 1.

32. The method of claim 27:

wherein the reference inductor component further has a reference core and a reference core size;

wherein a core size in the magnetic core is proportionally reduced relative to the reference core size; and wherein an effective permeability of the magnetic core is selected from or determined by a bounded region defined by and between an upper boundary value defined by a function ($\delta^{2/3}$) and a lower boundary value defined by a function ($\delta^{(2)}$).

33. The method of claim 27:

wherein the reference inductor component further has a reference core and a reference core size including a reference Window Area;

wherein a height of a Window Area in the magnetic core is linearly reduced relative to the reference Window Area; and wherein an effective permeability of the magnetic core is selected from or determined by a bounded region defined by and between an upper boundary value of 1 and a lower boundary value defined by a function ($\delta^{(-2)}$).

34. The method of claim 23, wherein an effective diameter ratio ($\delta$) of the electromagnetic inductor component relative to the reference conductor material is within a range of about $\delta^{-1/4}$ to about $\delta^{-1/2}$.

35. The method of claim 34, wherein an inductance value of the electromagnetic inductor component is selected from or determined by a bounded region defined by and between an upper boundary value defined by a function [$\beta*\delta^2$] and a lower boundary value of 1.

36. The method of claim 34, wherein a direct current resistance (DCR) value of the electromagnetic inductor component is selected from or determined by a bounded region defined by and between an upper boundary value of 1 and a lower boundary value defined by a function [$\beta^{(-1)}$*8 $\delta^{(-2)}$].

37. The method of claim 34, further comprising:

fabricating a magnetic core, wherein the reference inductor component further has a reference core and a reference core size;

wherein a core size in the magnetic core is proportionally reduced relative to the reference core size; and wherein the core size of the magnetic core is selected from or determined by a bounded region defined by and between an upper boundary value defined by a function [$\beta*\delta^{(4)}$] and a lower boundary value defined by a function ($\delta^2$).

38. The method of claim 34, further comprising:

fabricating a magnetic core, wherein the reference inductor component further has a reference core and a reference core size including a reference Window Area;

wherein a height of a Window Area in the magnetic core is linearly reduced relative to the reference Window Area; and wherein the height of the Window Area in the magnetic core is selected from or determined by a bounded region defined by and between an upper boundary value defined by a function ($\beta*\delta^2$) and lower boundary value of 1.

39. The method of claim 34, further comprising:

fabricating a magnetic core, wherein the reference inductor component further has a reference core and a reference core size;

wherein a core size in the magnetic core is proportionally reduced relative to the reference core size; and wherein an effective permeability of the magnetic core is selected from or determined by a bounded region defined by and between an upper boundary value defined by a function $\delta^{2/3}$ and a lower boundary value defined by a function [$\beta^{(-2/3)}*\delta^{(-2/3)}$].

40. The method of claim 34, further comprising:

fabricating a magnetic core, wherein the reference inductor component further has a reference core and a reference core size including a reference Window Area;

wherein a height of a Window Area in the magnetic core is linearly reduced relative to the reference Window Area; and wherein an effective permeability of the magnetic core is selected from or determined by a bounded region defined by and between an upper boundary value defined by a value of 1 and a lower boundary value defined by a function $(\beta^{-1}*\delta^{-2})$.

41. The method of claim 34, further comprising:

fabricating a magnetic core, wherein the reference inductor component further has a reference core and a reference core size;

wherein a core size in the magnetic core is proportionally reduced relative to the reference core size; and wherein the number of turns is selected from or determined by a bounded region defined by and between an upper boundary value defined by a function $[\beta^{(2/3)}*\delta^{(2/3)}]$ and a lower boundary defined by a function $(\delta^{(-2/3)})$.

42. The method of claim 34, further comprising:

fabricating a magnetic core; and assembling a coil with the fabricated magnetic core, the coil having a winding including a number of turns, wherein the reference inductor component further has a reference core and a reference core size including a reference Window Area;

wherein a height of a Window Area in the magnetic core is linearly reduced relative to the reference Window Area; and wherein the number of turns of the winding is selected from or determined by a bounded region defined by and between an upper boundary value defined by a function $[\beta*\delta^2]$ and a lower boundary value of 1.

43. The method of claim 3, further comprising:

fabricating a magnetic core; and assembling a coil with the fabricated magnetic core, the coil having a winding including a number of turns, wherein the magnetic core defines a core volume containing the winding;

wherein the core volume includes a Window Area (WA), a Mean Length Per Turn (MLT), and a Cross sectional Area (AC); and wherein one of the core volume and the number of turns is selected in view of one of the ratio of electrical conductivity (β) and the diameter ratio (δ) of the conductor relative to the reference conductor material.

* * * * *